US011825301B2

(12) United States Patent
Agarwal et al.

(10) Patent No.: US 11,825,301 B2
(45) Date of Patent: Nov. 21, 2023

(54) SECRET CONSTRUCTION OF PHYSICAL CHANNELS AND SIGNALS

(71) Applicant: QUALCOMM Incorporated, San Diego, CA (US)

(72) Inventors: Ravi Agarwal, San Diego, CA (US); Naga Bhushan, San Diego, CA (US); Gavin Bernard Horn, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 301 days.

(21) Appl. No.: 17/097,608

(22) Filed: Nov. 13, 2020

(65) Prior Publication Data

US 2021/0152335 A1 May 20, 2021

Related U.S. Application Data

(60) Provisional application No. 62/938,141, filed on Nov. 20, 2019.

(51) Int. Cl.
*H04W 12/037* (2021.01)
*H04L 9/06* (2006.01)
*H04W 56/00* (2009.01)
*H04L 9/30* (2006.01)
*H04L 9/08* (2006.01)
*H04L 5/00* (2006.01)
*H04W 72/23* (2023.01)

(52) U.S. Cl.
CPC ......... *H04W 12/037* (2021.01); *H04L 5/0048* (2013.01); *H04L 9/0656* (2013.01); *H04L 9/0869* (2013.01); *H04L 9/3073* (2013.01); *H04W 56/001* (2013.01); *H04W 72/23* (2023.01)

(58) Field of Classification Search
CPC .................................................. H04W 12/037
See application file for complete search history.

(56) References Cited

U.S. PATENT DOCUMENTS

| | | | | |
|---|---|---|---|---|
| 6,748,082 B1* | 6/2004 | Vieweg | ................... | H04L 9/083 380/278 |
| 6,792,108 B1* | 9/2004 | Patera | ................... | H04L 9/0668 380/42 |
| 8,107,397 B1* | 1/2012 | Bagchi | ................... | H04L 9/0833 380/278 |
| 9,294,447 B2* | 3/2016 | Viswanathan | .......... | H04L 51/52 |
| 9,877,322 B1* | 1/2018 | Sung | ................. | H04W 72/0446 |
| 10,692,078 B1* | 6/2020 | Kuo | ..................... | G06Q 20/385 |

* cited by examiner

*Primary Examiner* — Bradley W Holder
(74) *Attorney, Agent, or Firm* — Holland & Hart LLP

(57) ABSTRACT

Methods, systems, and devices for wireless communications are described. A user equipment (UE) and a serving base station may locally store secret information (e.g., side information, such as a secret key, a public key, etc.) that is used to protect physical (PHY) layer channel or signal transmissions. The UE and the serving base station may determine a next value of a pseudo random sequence that is a function of a current value of the pseudo random sequence and the secret information and may use the next value to determine a time-varying parameter. The UE and the serving base station may use this time-varying parameter to determine which tones, which symbols periods, or which sequence, is being used for a subsequent communication of a PHY layer channel or signal.

48 Claims, 17 Drawing Sheets

SECRET CONSTRUCTION OF PHYSICAL CHANNELS AND SIGNALS

CROSS REFERENCE

The present Application for Patent claims the benefit of U.S. Provisional Patent Application No. 62/938,141 by AGARWAL et al., entitled "SECRET CONSTRUCTION OF PHYSICAL CHANNELS AND SIGNALS," filed Nov. 20, 2019, assigned to the assignee hereof, and expressly incorporated by reference herein.

FIELD OF TECHNOLOGY

The following relates generally to wireless communications and more specifically to secret construction of physical (PHY) channels and signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications system, communications between a UE and a base station may not be secured. For example, signaling that occurs on a PHY layer may not be protected through current security primitives. As such, an adversary may have the ability to construct this PHY layer signaling and launch various attacks against the system. For example, such attacks may include selective jamming against a particular PHY channel and False Base Station (FBS) attacks. Efficient techniques are desired for securing the PHY layer signaling.

SUMMARY

The described techniques relate to improved methods, systems, devices, and apparatuses that support secret construction of PHY channels and signals. Generally, the described techniques provide for a UE and base station to generate a next output value of a pseudo random sequence generator (e.g., a stream cipher) based on a key set (e.g., side information, symmetric key, public key, private key, etc.) known to the UE and the base station. The UE and the base station may then use this next output value for constructing a time-varying PHY layer channel, or signal, or both, that is communicated between the UE and the base station. In some cases, the UE and the base station may use the key set and information from a current output value of the pseudo random sequence generator to determine the next output value and may use this next output value to vary one or more parameters of the time-varying PHY layer channel or signal. As such, based on varying the one or more parameters of the time-varying PHY layer channel or signal or both, using the key set known to the UE and the base station, the UE and the base station may communicate the PHY layer channel or signal in a secure manner.

The PHY layer channel or signal or both may include a synchronization signal block (e.g., synchronization signal (SS)/physical broadcast channel (PBCH) block (SSB)), a physical downlink control channel (PDCCH), a channel state information reference signal (CSI-RS), a sounding reference signal (SRS), a physical uplink control channel (PUCCH), a random access channel (RACH), or a combination thereof. In some cases, the sequence used for the construction of the PHY layer channel or signal, the frequency-domain tones used for transmission of the PHY layer channel or signal, the time-domain symbols used for transmission of the PHY layer channel or signal, or a combination thereof, may be hopped over time in concert with the pseudo random sequence. Additionally or alternatively, sequences for a demodulation reference signal (DMRS), a sequence for scrambling non-DMRS modulation symbols, a shift for mapping control channel elements (CCEs), an interleaver size, a resource element group (REG), or a combination thereof, may be hopped over time in concert with the pseudo random sequence, where the PHY layer channel or signal is based on the above described factors hopped over time in concert with the pseudo random sequence.

A method of wireless communications by a UE is described. The method may include generating a next output value of a pseudo random sequence generator based on a key set that is known at least in part by the UE and a serving base station, determining a time-varying communication parameter based on the next output value of the pseudo random sequence generator, and communicating a PHY layer transmission with the serving base station based on the time-varying communication parameter.

An apparatus for wireless communications by a UE is described. The apparatus may include a processor, memory coupled with the processor, and instructions stored in the memory. The instructions may be executable by the processor to cause the apparatus to generate a next output value of a pseudo random sequence generator based on a key set that is known at least in part by the UE and a serving base station, determine a time-varying communication parameter based on the next output value of the pseudo random sequence generator, and communicate a PHY layer transmission with the serving base station based on the time-varying communication parameter.

Another apparatus for wireless communications by a UE is described. The apparatus may include means for generating a next output value of a pseudo random sequence generator based on a key set that is known at least in part by the UE and a serving base station, determining a time-varying communication parameter based on the next output value of the pseudo random sequence generator, and communicating a PHY layer transmission with the serving base station based on the time-varying communication parameter.

A non-transitory computer-readable medium storing code for wireless communications by a UE is described. The code may include instructions executable by a processor to generate a next output value of a pseudo random sequence generator based on a key set that is known at least in part by the UE and a serving base station, determine a time-varying communication parameter based on the next output value of the pseudo random sequence generator, and communicate a PHY layer transmission with the serving base station based on the time-varying communication parameter.

In some examples of the method, apparatuses, and non-transitory computer-readable medium described herein, communicating the PHY layer transmission may include operations, features, means, or instructions for communicating the PHY layer transmission based on one or more frequency-domain tones indicated by the time-varying communication parameter.

In some examples of the method, apparatuses, and non-transitory computer-readable medium described herein, communicating the PHY layer transmission may include operations, features, means, or instructions for communicating the PHY layer transmission that may be an SSB, a PDCCH transmission, a PUCCH transmission, a RACH transmission, a CSI-RS, an SRS, or any combination thereof, in accordance with the one or more frequency-domain tones indicated by the time-varying communication parameter.

In some examples of the method, apparatuses, and non-transitory computer-readable medium described herein, communicating the PHY layer transmission may include operations, features, means, or instructions for communicating the PHY layer transmission based on one or more time-domain symbols indicated by the time-varying communication parameter.

Some examples of the method, apparatuses, and non-transitory computer-readable medium described herein may further include operations, features, means, or instructions for communicating the PHY layer transmission that may be an SSB, a PDCCH transmission, a PUCCH transmission, a RACH transmission, a CSI-RS, an SRS, or any combination thereof, in accordance with the one or more time-domain symbols indicated by the time-varying communication parameter.

In some examples of the method, apparatuses, and non-transitory computer-readable medium described herein, the key set may include a symmetric key that is known by the UE and the serving base station.

In some examples of the method, apparatuses, and non-transitory computer-readable medium described herein, the key set may include a public key and a private key, where the public key is known by the UE and the private key is known by the serving base station, or the private key is known by the UE and the public key is known by the serving base station.

In some examples of the method, apparatuses, and non-transitory computer-readable medium described herein, generating the next output value may include operations, features, means, or instructions for generating the next output value based on a current state of the pseudo random sequence generator, the current state of the pseudo random sequence generator being known to the UE and the serving base station based on a prior communication, or a current communication, or both.

In some examples of the method, apparatuses, and non-transitory computer-readable medium described herein, communicating the PHY layer transmission may include operations, features, means, or instructions for receiving the PHY layer transmission that may be an SSB that includes a physical cell identifier (PCI) index in a primary synchronization signal (PSS), a secondary synchronization signal (SSS), or both, the PCI index indicated by the time-varying communication parameter.

In some examples of the method, apparatuses, and non-transitory computer-readable medium described herein, communicating the PHY layer transmission may include operations, features, means, or instructions for receiving the PHY layer transmission that may be at least a DMRS modulation symbol generated using a reference signal sequence indicated by the time-varying communication parameter.

In some examples of the method, apparatuses, and non-transitory computer-readable medium described herein, communicating the PHY layer transmission may include operations, features, means, or instructions for receiving the PHY layer transmission that may be a PDCCH transmission that may be scrambled using a scrambling sequence indicated by the time-varying communication parameter.

In some examples of the method, apparatuses, and non-transitory computer-readable medium described herein, communicating the PHY layer transmission may include operations, features, means, or instructions for receiving, in accordance with a shift index indicated by the time-varying communication parameter, the PHY layer transmission that may be a PDCCH transmission, the shift index indicating a mapping for at least one CCE to at least one physical resource for the PDCCH transmission.

In some examples of the method, apparatuses, and non-transitory computer-readable medium described herein, communicating the PHY layer transmission may include operations, features, means, or instructions for receiving, in accordance with an interleaver size, REG bundle size, or both, indicated by the time-varying communication parameter, the PHY layer transmission that may be a PDCCH transmission, the interleaver size, REG bundle size, or both indicating a mapping for at least one CCE to at least one physical resource for the PDCCH transmission.

In some examples of the method, apparatuses, and non-transitory computer-readable medium described herein, communicating the PHY layer transmission may include operations, features, means, or instructions for receiving the PHY layer transmission based on a number of time-domain symbols for the PHY layer transmission indicated by the time-varying communication parameter.

In some examples of the method, apparatuses, and non-transitory computer-readable medium described herein, communicating the PHY layer transmission may include operations, features, means, or instructions for receiving the PHY layer transmission that may be a CSI-RS that may be generated using a reference signal sequence indicated by the time-varying communication parameter.

In some examples of the method, apparatuses, and non-transitory computer-readable medium described herein, communicating the PHY layer transmission may include operations, features, means, or instructions for transmitting the PHY layer transmission that may be an SRS that may be generated using a reference signal sequence indicated by the time-varying communication parameter.

In some examples of the method, apparatuses, and non-transitory computer-readable medium described herein, communicating the PHY layer transmission may include operations, features, means, or instructions for transmitting the PHY layer transmission that may be a PUCCH transmission that may be generated using a reference signal sequence indicated by the time-varying communication parameter.

In some examples of the method, apparatuses, and non-transitory computer-readable medium described herein, communicating the PHY layer transmission may include operations, features, means, or instructions for transmitting the PHY layer transmission that may be a RACH transmission that may be generated using a reference signal sequence indicated by the time-varying communication parameter.

Some examples of the method, apparatuses, and non-transitory computer-readable medium described herein may further include operations, features, means, or instructions for generating a second next output value of the pseudo random sequence generator based on the key set, determining a second time-varying communication parameter based on the second next output value of the pseudo random sequence generator, and communicating a second PHY layer transmission with the serving base station based on the second time-varying communication parameter.

In some examples of the method, apparatuses, and non-transitory computer-readable medium described herein, the pseudo random sequence generator may be a stream cipher.

A method of wireless communications by a base station is described. The method may include generating a next output value of a pseudo random sequence generator based on a key set that is known at least in part by a UE and the base station, determining a time-varying communication parameter based on the next output value of the pseudo random sequence generator, and communicating a PHY layer transmission with the UE based on the time-varying communication parameter.

An apparatus for wireless communications by a base station is described. The apparatus may include a processor, memory coupled with the processor, and instructions stored in the memory. The instructions may be executable by the processor to cause the apparatus to generate a next output value of a pseudo random sequence generator based on a key set that is known at least in part by a UE and the base station, determine a time-varying communication parameter based on the next output value of the pseudo random sequence generator, and communicate a PHY layer transmission with the UE based on the time-varying communication parameter.

Another apparatus for wireless communications by a base station is described. The apparatus may include means for generating a next output value of a pseudo random sequence generator based on a key set that is known at least in part by a UE and the base station, determining a time-varying communication parameter based on the next output value of the pseudo random sequence generator, and communicating a PHY layer transmission with the UE based on the time-varying communication parameter.

A non-transitory computer-readable medium storing code for wireless communications by a base station is described. The code may include instructions executable by a processor to generate a next output value of a pseudo random sequence generator based on a key set that is known at least in part by a UE and the base station, determine a time-varying communication parameter based on the next output value of the pseudo random sequence generator, and communicate a PHY layer transmission with the UE based on the time-varying communication parameter.

In some examples of the method, apparatuses, and non-transitory computer-readable medium described herein, communicating the PHY layer transmission may include operations, features, means, or instructions for communicating the PHY layer transmission based on one or more frequency-domain tones indicated by the time-varying communication parameter.

In some examples of the method, apparatuses, and non-transitory computer-readable medium described herein, communicating the PHY layer transmission may include operations, features, means, or instructions for communicating the PHY layer transmission that may be an SSB, a PDCCH transmission, a PUCCH transmission, a RACH transmission, a CSI-RS, an SRS, or any combination thereof, in accordance with the one or more frequency-domain tones indicated by the time-varying communication parameter.

In some examples of the method, apparatuses, and non-transitory computer-readable medium described herein, communicating the PHY layer transmission may include operations, features, means, or instructions for communicating the PHY layer transmission based on one or more time-domain symbols indicated by the time-varying communication parameter.

Some examples of the method, apparatuses, and non-transitory computer-readable medium described herein may further include operations, features, means, or instructions for communicating the PHY layer transmission that may be an SSB, a PDCCH transmission, a PUCCH transmission, a RACH transmission, a CSI-RS, an SRS, or any combination thereof, in accordance with the one or more time-domain symbols indicated by the time-varying communication parameter.

In some examples of the method, apparatuses, and non-transitory computer-readable medium described herein, the key set may include a symmetric key that is known by the UE and the serving base station.

In some examples of the method, apparatuses, and non-transitory computer-readable medium described herein, the key set may include a public key and a private key, where the public key is known by the UE and the private key is known by the base station, or the private key is known by the UE and the public key is known by the base station.

In some examples of the method, apparatuses, and non-transitory computer-readable medium described herein, generating the next output value may include operations, features, means, or instructions for generating the next output value based on a current state of the pseudo random sequence generator, the current state of the pseudo random sequence generator being known to the UE and the base station based on a prior communication, or a current communication, or both.

In some examples of the method, apparatuses, and non-transitory computer-readable medium described herein, communicating the PHY layer transmission may include operations, features, means, or instructions for transmitting the PHY layer transmission that may be an SSB that includes a PCI index in a PSS, an SSS, or both, the PCI index indicated by the time-varying communication parameter.

In some examples of the method, apparatuses, and non-transitory computer-readable medium described herein, communicating the PHY layer transmission may include operations, features, means, or instructions for transmitting the PHY layer transmission that may be at least a DMRS modulation symbol generated using a reference signal sequence indicated by the time-varying communication parameter.

In some examples of the method, apparatuses, and non-transitory computer-readable medium described herein, communicating the PHY layer transmission may include operations, features, means, or instructions for transmitting the PHY layer transmission that may be a PDCCH transmission that may be scrambled using a scrambling sequence indicated by the time-varying communication parameter.

In some examples of the method, apparatuses, and non-transitory computer-readable medium described herein, communicating the PHY layer transmission may include operations, features, means, or instructions for transmitting, in accordance with a shift index indicated by the time-varying communication parameter, the PHY layer transmission that may be a PDCCH transmission, the shift index indicating a mapping for at least one CCE to at least one physical resource for the PDCCH transmission.

In some examples of the method, apparatuses, and non-transitory computer-readable medium described herein, communicating the PHY layer transmission may include operations, features, means, or instructions for transmitting, in accordance with an interleaver size, REG bundle size, or both, indicated by the time-varying communication parameter, the PHY layer transmission that may be a PDCCH transmission, the interleaver size, REG bundle size, or both indicating a mapping for at least one CCE to at least one physical resource for the PDCCH transmission.

In some examples of the method, apparatuses, and non-transitory computer-readable medium described herein, communicating the PHY layer transmission may include operations, features, means, or instructions for transmitting the PHY layer transmission based on a number of time-domain symbols for the PHY layer transmission indicated by the time-varying communication parameter.

In some examples of the method, apparatuses, and non-transitory computer-readable medium described herein, communicating the PHY layer transmission may include operations, features, means, or instructions for transmitting the PHY layer transmission that may be a CSI-RS that may be generated using a reference signal sequence indicated by the time-varying communication parameter.

In some examples of the method, apparatuses, and non-transitory computer-readable medium described herein, communicating the PHY layer transmission may include operations, features, means, or instructions for receiving the PHY layer transmission that may be an SRS that may be generated using a reference signal sequence indicated by the time-varying communication parameter.

In some examples of the method, apparatuses, and non-transitory computer-readable medium described herein, communicating the PHY layer transmission may include operations, features, means, or instructions for receiving the PHY layer transmission that may be a PUCCH transmission that may be generated using a reference signal sequence indicated by the time-varying communication parameter.

In some examples of the method, apparatuses, and non-transitory computer-readable medium described herein, communicating the PHY layer transmission may include operations, features, means, or instructions for receiving the PHY layer transmission that may be a RACH transmission that may be generated using a reference signal sequence indicated by the time-varying communication parameter.

Some examples of the method, apparatuses, and non-transitory computer-readable medium described herein may further include operations, features, means, or instructions for generating a second next output value of the pseudo random sequence generator based on the key set, determining a second time-varying communication parameter based on the second next output value of the pseudo random sequence generator, and communicating a second PHY layer transmission with the UE based on the second time-varying communication parameter.

In some examples of the method, apparatuses, and non-transitory computer-readable medium described herein, the pseudo random sequence generator may be a stream cipher.

DETAILED DESCRIPTION

In some wireless communications systems (e.g., LTE, NR, 5G, etc.), security for the air interface may be implemented at a Packet Data Convergence Protocol (PDCP) layer through ciphering and integrity protection of data and signaling packets. However, any signaling that originates below the PDCP layer may not be secured. For example, PHY layer channels and signals, such as an SSB, a PDCCH transmission, a PUCCH transmission, a RACH transmission, a CSI-RS, an SRS, or a combination thereof, may not be protected through security primitives. As such, an adversary may have the ability to construct these PHY layer channels and signals and launch various attacks against the system. For example, such attacks can include selective jamming against a particular PHY channel and FBS attacks.

As described herein, a UE and a serving base station may locally store secret information (e.g., side information, such as a symmetric key, a secret key, a public key, etc.) that is used to protect transmissions. The UE and the serving base station may determine a next value of a pseudo random sequence (e.g., a stream cipher) that is a function of a current value of the pseudo random sequence and the secret information and may use the next value to determine a time-varying parameter. The UE and the serving base station may use this time-varying parameter to determine which tones, which symbols periods, or which sequence, or any combination thereof, is being used for a subsequent communication of a PHY layer channel or signal.

Aspects of the disclosure are initially described in the context of a wireless communications system. Additionally, aspects of the disclosure are illustrated through an additional wireless communications system, a resource grid, and a process flow. Aspects of the disclosure are further illustrated by and described with reference to apparatus diagrams, system diagrams, and flowcharts that relate to secret construction of PHY channels and signals.

Figure 1:
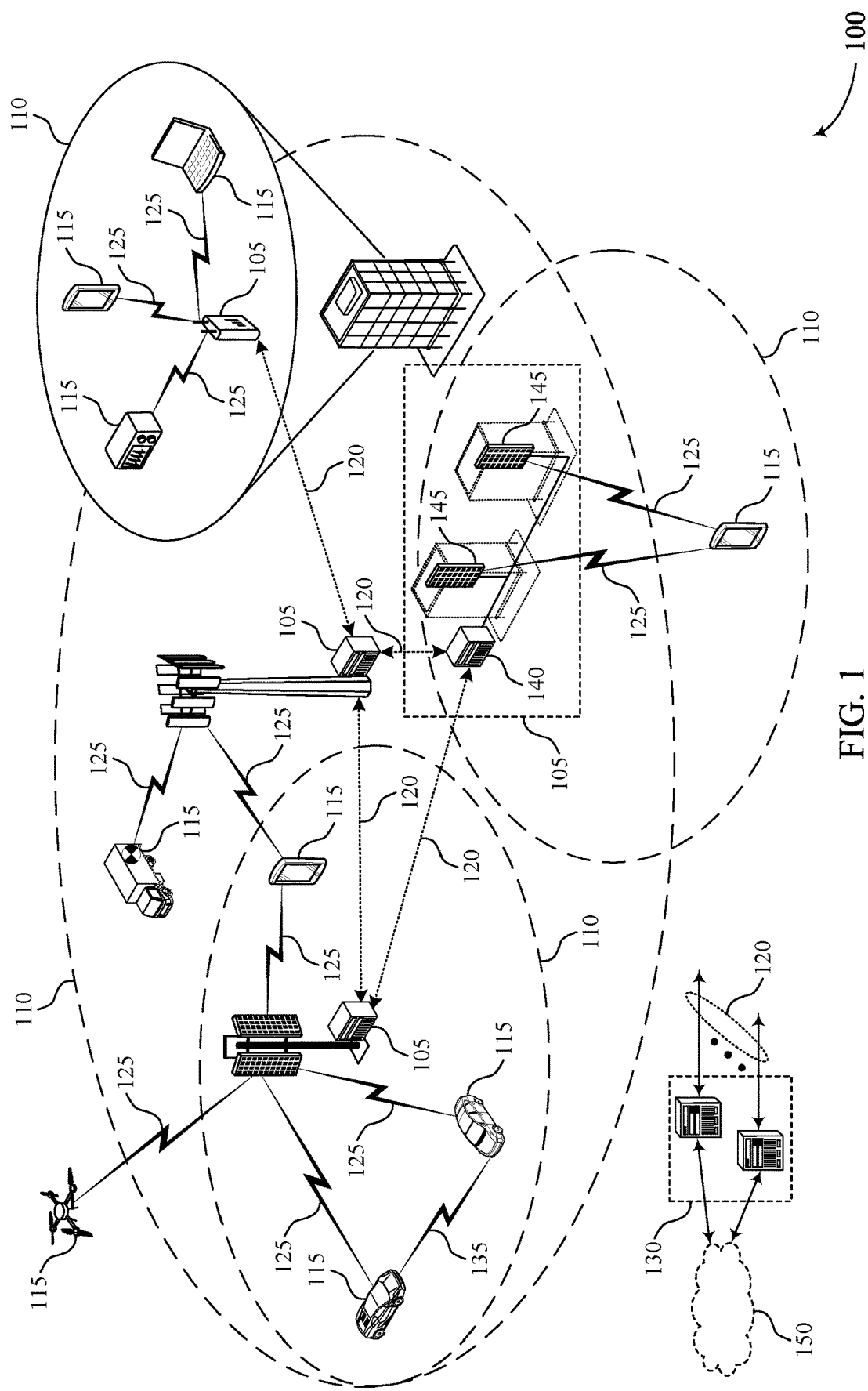
FIG. 1 illustrates an example of a system for wireless communications that supports secret construction of PHY channels and signals in accordance with aspects of the present disclosure.

FIG. 1 illustrates an example of a wireless communications system 100 that supports secret construction of PHY channels and signals in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined PHY layer structure for supporting the communication links 125. For example, a carrier used for a communication link 125 may include a portion of a radio frequency spectrum band (e.g., a bandwidth part (BWP)) that is operated according to one or more PHY layer channels for a given radio access technology (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

PHY channels may be multiplexed on a carrier according to various techniques. A PHY control channel and a PHY data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a PHY control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., CCEs) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

The wireless communications system 100 may be a packet-based network that operates according to a layered protocol stack. In the user plane, communications at the bearer or PDCP layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the PHY layer, transport channels may be mapped to PHY channels.

In some cases (e.g., for LTE, NR, etc.), security for the air interface (e.g., wireless communications) is implemented at the PDCP layer through ciphering and integrity protection of data and signaling packets. However, signaling that originates below the PDCP layer may not be secured. For example, PHY layer channels and signals such as an SSB, a PDCCH transmission, a PUCCH transmission, a RACH transmission, a CSI-RS, an SRS, or a combination thereof may not be protected through security primitives. Accordingly, in an open standard (e.g., 5G NR), an adversary has the ability to construct these PHY layer channels and signals and to launch various attacks against the system. Such attacks can include selective jamming against a particular PHY channel and FBS attacks.

For example, in a potential attack against the system, an FBS attacker may transmit a constructed SSB. Accordingly, a UE 115 (e.g., in a connected state with a serving cell, such as an RRC CONNECTED state) in the vicinity (e.g., geographically close) of the FBS may measure and report the signal strength and a PCI as obtained from the SSB transmitted by the FBS to its serving cell. In some cases, a legitimate cell with the same PCI may be connected to the serving base station 105 (e.g., a gNB or base station of the serving cell), and the serving base station 105 may initiate a handover to the reported cell. However, since the UE 115 is measuring a signal strength of the FBS (e.g., from the constructed SSB) and not the legitimate cell, handover to the legitimate cell may fail. As such, the FBS attacker can cause call drops (e.g., handover failures) for the UE 115.

Additionally or alternatively, in another potential attack against the system, an FBS attacker may listen to and record System Information (SI) including a master information block (MIB), remaining minimum system information (RMSI), and other system information (OSI) transmitted by a legitimate cell. Subsequently, the FBS may then transmit an SSB (e.g., possibly with a different PCI) and a PDCCH or physical downlink shared channel (PDSCH) or both carrying system information (e.g., RMSI, SI, OSI, etc.). Accordingly, in some cases, a UE 115 (e.g., in an idle or inactive state, such as an RRC_IDLE or RRC_INACTIVE state) in the vicinity of the FBS may measure good SSB signal strength from the FBS and camp on the FBS after reading the SI. However, the UE 115 may not receive mobile-terminated (MT) or emergency calls while camping on the FBS (e.g., since the FBS is not connected to the network and cannot transmit MT or emergency calls) and may remain unaware of the existence of the FBS unless the UE 115 initiates signaling on the uplink and does not receive a response (e.g., an integrity protected response). In this way, the FBS may be able to successfully launch a denial-of-service (DOS) attack and remain undetected for a substantial amount of time.

Additionally or alternatively, in another potential attack against the system, a man-in-the-middle (MITM) FBS may be positioned (e.g., sits) in the middle of a UE 115 and a legitimate base station 105 (e.g., a legitimate cell) in the form of a malicious repeater. For example, the MITM FBS (e.g., in the form of the malicious repeater) may act as a legitimate cell towards the UE 115 and as a UE 115 towards the legitimate cell. Accordingly, in some cases, the MITM FBS may receive transmissions from the legitimate cell and may selectively drop some CSI-RS transmissions. Subsequently, any UE 115 connected to a legitimate cell through the MITM FBS may occasionally measure and report poor channel state information (CSI) based on the dropped CSI-RS transmissions, which can result in lower downlink throughput (e.g., the UE 115 may lower a modulation and coding scheme (MCS) multiple times to an inefficient level based on the poor CSI) and application layer data outages.

These above described attacks and other attacks targeting PHY layer channels and signals may exploit the fact that there is no security built into the PHY layer. For example, in the attack where an FBS attacker transmits a constructed SSB to cause handover failures and call drops, the FBS may construct and mimic an SSB of a legitimate neighbor cell. In the attack where an FBS attacker transmits SI to get a UE 115 to camp on the FBS for a DOS attack, the FBS may construct the SSB and PDCCH/PDSCH carrying the SI to camouflage as a legitimate cell. Additionally or alternatively, in the attack where a MITM FBS drops some CSI-RS transmissions, the FBS may determine the location of the CSI-RS resources to selectively drop the CSI-RS transmissions without being detected. In some cases, CSI-RSs may be configured for the UE 115 in a ciphered RRC message (e.g., an RRC Reconfiguration message), and the FBS may not be aware of CSI-RS parameters (e.g., occupied RBs and symbols, scrambling identification (ID), etc.) but can deduce the same CSI-RS parameters over time by running a brute force correlation with all possible hypotheses. Accordingly, security primitives may be desired for transmission of PHY layer channels and signals.

Wireless communications system 100 may support efficient techniques for a secret construction of PHY layer channels and signals by a UE 115 and a base station 105 based on generating a next output value using a pseudo random sequence (e.g., keystream, stream cipher, etc.) that is based on a key set (e.g., side information) known to the UE 115 and the base station 105. For example, the key set may include a symmetric key that both the UE 115 and the base station 105 know, a public key-private key known at the UE 115 and the base station 105, or a combination thereof. Subsequently, based on the next output value of the pseudo random sequence, the UE 115 or the base station 105 or both may construct a PHY layer channel or signal to transmit, where the recipient of the PHY layer channel or signal identifies a time-varying parameter used for transmitting and receiving the PHY layer channel or signal based on the next output value. The time-varying parameter may include frequency-domain tones, time-domain symbols, sequences, or a combination thereof used to transmit and receive the PHY layer channel or signal.

Figure 2:
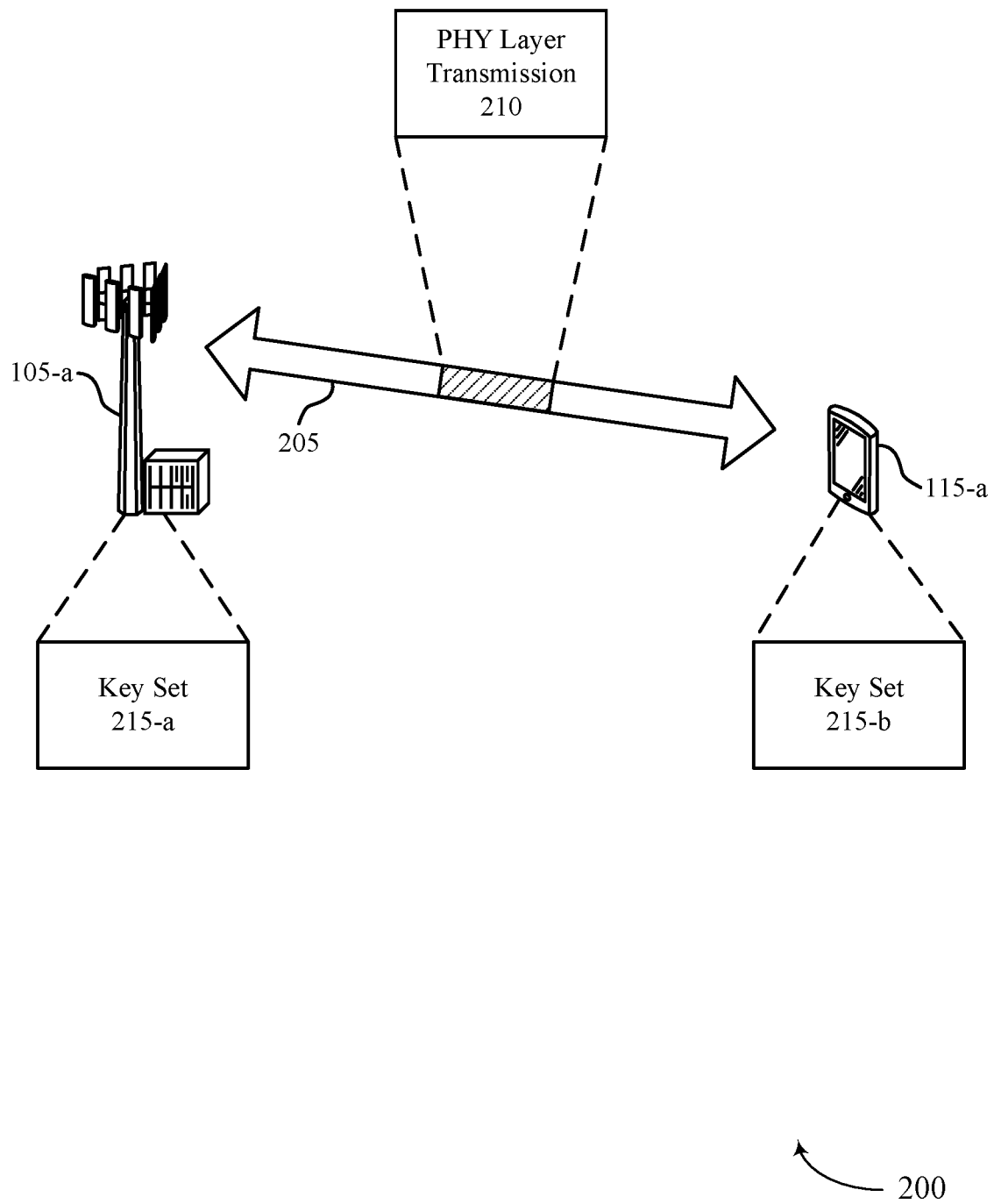
FIG. 2 illustrates an example of a wireless communications system that supports secret construction of PHY channels and signals in accordance with aspects of the present disclosure.

FIG. 2 illustrates an example of a wireless communications system 200 that supports secret construction of PHY channels and signals in accordance with aspects of the present disclosure. In some examples, wireless communications system 200 may implement aspects of wireless communications system 100. For example, wireless communications system 200 may include a base station 105-a and a UE 115-a, which may be examples of corresponding base stations 105 and UEs 115, respectively, as described with reference to FIG. 1. Additionally, base station 105-a and UE 115-a may communicate on resources of a carrier 205.

As described herein, UE 115-a and base station 105-a may secure a PHY layer transmission 210 (e.g., PHY layer channels and signals) using a time-varying secret construction. For example, the secret construction may include two parts. A first part of the secret construction may include using a secret pseudo random sequence (e.g., a keystream for a stream cipher), such that given the previous output digits of the sequence, it is not possible to determine the next output digit with any confidence without knowledge of some side information (e.g., a key set) used to generate the pseudo random sequence. However, if the side information is known, the next output digit can be deterministically calculated. This side information may be known to UE 115-a and base station 105-a (e.g., the network) and may be unknown to a potential attacker. Such a pseudo random sequence may be generated, for example, by means of stream ciphers.

The second part of the secret construction may include incorporating the pseudo random sequence in the construction of one or more PHY layer transmissions 210. For example, UE 115-a and base station 105-a may change one or more elements (e.g., time-varying parameters) used for the construction of PHY layer transmission 210 over time in concert with a pseudo random sequence generated using the side information unknown to the attacker. Accordingly, attacks such as the ones highlighted with reference to FIG. 1 (e.g., the FBS attacks, selective jamming attacks, etc.) may be prevented. In some cases, the time-varying elements may include, but are not limited to, the frequency-domain tones, time-domain symbols, sequences, or a combination thereof used for transmitting and receiving PHY layer transmission 210.

As shown, base station 105-a and UE 115-a may include a respective key set 215 that is used as the side information for secretly constructing PHY layer transmission 210. For example, base station 105-a may have a key set 215-a, and UE 115-a may have a key set 215-b. UE 115-a may have key set 215-b pre-loaded when manufactured or received securely from a network device (e.g., via a wired connection that cannot be accessed by an attacker).

In some cases, the key sets 215 may include a symmetric key used by both UE 115-a and base station 105-a for a symmetric encryption and decryption scheme. For example, symmetric encryption schemes may rely on a single key that is shared between two or more users (e.g., base station 105-a and one or more UEs 115 including UE 115-a). The same key may then be used to encrypt and decrypt so-called plaintext (e.g., the message or piece of data that is being encoded). The process of encryption may consist of running a plaintext (input) through an encryption algorithm called a cipher, which in turn generates a ciphertext (output). If the encryption scheme is strong enough, the only way for a person to read or access the information contained in the ciphertext may be by using the corresponding key to decrypt it. The process of decryption may include converting the ciphertext back to plaintext.

Symmetric encryption schemes may be based on block ciphers or stream ciphers or a combination thereof. Block ciphers may group data into blocks of predetermined size, and each block may be encrypted using a corresponding key and encryption algorithm based on the predetermined size of each block (e.g., 128-bit plaintext is encrypted into 128-bit ciphertext). Additionally or alternatively, stream ciphers may not encrypt plaintext data by blocks but rather by 1-bit increments (e.g., 1-bit plaintext is encrypted into 1-bit ciphertext at a time).

Additionally or alternatively, the key sets 215 may include a public key and a private key used by UE 115-a and base station 105-a for an asymmetric encryption and decryption scheme. In a public key cryptography (PKC) scheme, the public key may be used by a sender to encrypt information, while the private key is used by a recipient to decrypt the information. Because the two keys are different from one another, the public key may be safely shared without compromising the security of the private key. Each asymmetric key pair may be unique, ensuring that a message encrypted using a public key can only be read by a recipient who possesses the corresponding private key. Since private keys are not shared, the private keys may be stored in the software or operating system of base station 105-a, UE 115-a, or both or on hardware (e.g., a universal serial bus (USB) token, hardware security module, etc.) containing drivers that allow the hardware to be used with software or an operating system of UE 115-a, base station 105-a, or both.

In some cases, the PKC scheme may further use a Rivest-Shamir-Adleman (RSA) algorithm to generate the public and private keys. In the RSA scheme, keys may be generated using a modulus that is arrived at by multiplying two numbers (e.g., often two large prime numbers). That is, the modulus may generate two keys (e.g., the one public key that can be shared, and the one private key that should be kept in secret). The PKC scheme may use other algorithms or other means to generate the public and private keys.

Accordingly, UE 115-a and base station 105-a may use the key sets 215 to determine the next output value of the pseudo random sequence to determine time-varying parameters of PHY layer transmission 210. Additionally, PHY layer transmission 210 may include a PHY layer channel or signal transmitted from base station 105-a to UE 115-a or a PHY layer channel or signal transmitted from UE 115-a to base station 105-a. For example, PHY layer transmission 210 may include an SSB, a PDCCH, a CSI-RS, an SRS, a PUCCH, a RACH transmission, or a combination thereof.

When PHY layer transmission 210 includes an SSB, different options may exist for secret construction of the SSB. The SSB may be composed of a PSS, an SSS, and a PBCH. One option for secretly constructing the SSB may include determining an index (e.g., in the range [0, 1023]) for a PCI of base station 105-a (e.g., a serving cell on base station 105-a for UE 115-a) based on sequences used for the PSS and the SSS together. In some cases, the index may be hopped over time in concert with the pseudo random sequence. Accordingly, while performing a search for base station 105-a (e.g., a serving cell on base station 105-a), UE 115-a may find and decode the SSB at a current time instant. Additionally, the contents of the SSB may include information regarding the current 'tick' of the pseudo random sequence. Based on the key sets 215 (e.g., the side information) available at UE 115-a and base station 105-a, the PCI to be used at the next time instant (e.g., a time-varying parameter) for the PCI when transmitting/receiving the SSB may be calculated using the output (e.g., digit) at a corresponding next 'tick' of the pseudo random sequence (e.g., the next output value). The attacker, on the other hand, without access to the key sets 215 (e.g., necessary side information) may not be able to synthesize a valid SSB signal for the next time instant.

Additionally or alternatively, another option for the secret construction of the SSB may include determining frequency-domain tones used for SSB transmissions that are hopped over time in concert with a pseudo random sequence. Accordingly, while performing a search for base station 105-*a* (e.g., a serving cell on base station 105-*a*), UE 115-*a* may find and decode the SSB at a current time instant, where the contents of the SSB include information regarding the current 'tick' of the pseudo random sequence. Based on the key sets 215 (e.g., the side information) available at UE 115-*a* and base station 105-*a*, the frequency-domain tones to be used at a next time instant (e.g., a time-varying parameter) for transmitting/receiving the SSB may be calculated using the output at a corresponding next 'tick' of the pseudo random sequence (e.g., the next output value). The attacker, on the other hand, without access to the key sets 215 (e.g., necessary side information) may not be able to synthesize a valid SSB signal for the next time instant.

Another option for the secret construction of the SSB may include determining time-domain symbols used for SSB transmissions that are hopped over time in concert with a pseudo random sequence. Accordingly, while performing a search for base station 105-*a* (e.g., a serving cell on base station 105-*a*), UE 115-*a* may find and decode the SSB at a current time instant, where the contents of the SSB include information regarding the current 'tick' of the pseudo random sequence. Based on the key sets 215 (e.g., the side information) available at UE 115-*a* and base station 105-*a*, the time-domain symbols to be used at a next time instant (e.g., time-varying parameter) for transmitting/receiving the SSB may be calculated using the output at a corresponding next 'tick' of the pseudo random sequence (e.g., the next output value). The attacker, on the other hand, without access to the key sets 215 (e.g., necessary side information) may not be able to synthesize a valid SSB signal for the next time instant.

In some cases, the options for the construction of the SSB based on determining the frequency-domain tones, the time-domain symbols, or both may incur higher search costs for UE 115-*a*. For example, when determining the frequency-domain tones for a next transmission of the SSB, UE 115-*a* may search a same frequency multiple times to find an SSB since, prior to decoding the SSB, UE 115-*a* may not have information on a current time instant or a current 'tick' of the pseudo random sequence.

Additionally or alternatively, PHY layer transmission 210 may be a PDCCH transmission, where the PDCCH is a downlink control channel used to carry downlink control information (DCI) (e.g., such as scheduling information for a PDSCH). The PDCCH may be composed of non-DMRS and DMRS modulation symbols. One or more options may exist for secret construction of a PDCCH. For example, a sequence used for generating a DMRS may be hopped over time in concert with a pseudo random sequence. Accordingly, based on a current 'tick' and the key sets 215 (e.g., the side information) available at UE 115-*a* and base station 105-*a*, the sequence to be used at a next time instant (e.g., time-varying parameter) for the DMRS modulation symbols may be calculated using the output at a corresponding next 'tick' of the pseudo random sequence (e.g., the next output value). This determination of the hopping of the DMRS modulation symbols may protect against an attacker trying to synthesize a valid PDCCH transmission without knowledge of the key sets 215 (e.g., the side information) used to generate the pseudo random sequence.

In some cases, a sequence used for scrambling non-DMRS modulation symbols for a PDCCH may be hopped over time in concert with a pseudo random sequence. Accordingly, based on a current 'tick' and the key sets 215 (e.g., the side information) available at UE 115-*a* and base station 105-*a*, the sequence to be used at a next time instant (e.g., time-varying parameter) for scrambling the non-DMRS modulation symbols may be calculated using the output at a corresponding next 'tick' of the pseudo random sequence (e.g., the next output value). This determination of the hopping of the non-DMRS modulation symbols may protect against an attacker trying to synthesize a valid PDCCH transmission without knowledge of the key sets 215 (e.g., the side information) used to generate the pseudo random sequence.

Additionally or alternatively, an index to indicate a shift (e.g., shiftIndex) for mapping CCEs to physical resources for a PDCCH may be hopped over time in concert with a pseudo random sequence. In some cases, an interleaver size, an REG bundle size, or both used for mapping CCEs to physical resources for PDCCH may be hopped over time in concert with the pseudo random sequence. Accordingly, based on a current 'tick' and the key sets 215 (e.g., the side information) available at UE 115-*a* and base station 105-*a*, the index for the shift, the interleaver size, the REG bundle size, or a combination thereof to be used at a next time instant (e.g., time-varying parameter) for mapping the CCEs to physical resources of the PDCCH may be calculated using the output at a corresponding next 'tick' of the pseudo random sequence (e.g., the next output value). This determination of the index for the shift, the interleaver size, the REG bundle size, or a combination thereof for mapping CCEs to physical resources of the PDCCH may protect against an attacker trying to synthesize a valid PDCCH transmission without knowledge of the key sets 215 (e.g., the side information) used to generate the pseudo random sequence.

Additionally or alternatively, frequency-domain tones used for a PDCCH transmission may be hopped over time in concert with a pseudo random sequence. Accordingly, based on a current 'tick' and the key sets 215 (e.g., the side information) available at UE 115-*a* and base station 105-*a*, the frequency-domain tones to be used at a next time instant (e.g., time-varying parameter) for the PDCCH may be calculated using the output at a corresponding next 'tick' of the pseudo random sequence (e.g., the next output value). This determination of the frequency-domain tones of the PDCCH transmission may protect against an attacker trying to synthesize a valid PDCCH transmission without knowledge of the key sets 215 (e.g., the side information) used to generate the pseudo random sequence.

In some cases, time-domain symbols (e.g., symbols within a slot as well as slot offset within a periodic search space) used for a PDCCH transmission may be hopped over time in concert with a pseudo random sequence. Accordingly, based on a current 'tick' and the key sets 215 (e.g., the side information) available at UE 115-*a* and base station 105-*a*, the time-domain symbols to be used at a next time instant (e.g., time-varying parameter) for the PDCCH may be calculated using the output at a corresponding next 'tick' of the pseudo random sequence (e.g., the next output value). This determination of the time-domain symbols of the PDCCH transmission may protect against an attacker trying to synthesize a valid PDCCH transmission without knowledge of the key sets 215 (e.g., the side information) used to generate the pseudo random sequence.

Additionally or alternatively, a duration (e.g., a number of time-domain symbols used) for the PDCCH transmission may be hopped over time in concert with a pseudo random sequence. Accordingly, based on a current 'tick' and the key sets 215 (e.g., the side information) available at UE 115-*a* and base station 105-*a*, the duration for the PDCCH transmission to be used at a next time instant (e.g., time-varying parameter) may be calculated using the output at a corresponding next 'tick' of the pseudo random sequence (e.g., the next output value). This determination of the duration of the PDCCH transmission may protect against an attacker trying to synthesize a valid PDCCH transmission without knowledge of the key sets 215 (e.g., the side information) used to generate the pseudo random sequence The different options for secretly constructing the PDCCH described may not be mutually exclusive. For example, determining the sequence used for DMRSs in the PDCCH as described may help against an attacker attempting to synthesize a valid PDCCH transmission. However, a MITM attacker may still drop PDCCH transmissions from a legitimate cell if aware of the frequency-domain tones and time-domain symbols used for PDCCH transmissions. Accordingly, determining the frequency-domain tones, the time-domain symbols, or both for a PDCCH transmitted at the next time instant as described based in part on the key sets 215 may help prevent against such drops by varying the frequency-domain tones, the time-domain symbols, or both used for PDCCH transmissions.

Additionally or alternatively, PHY layer transmission 210 may include a CSI-RS, which is a reference signal used to measure a channel state (e.g., including a channel quality indicator (CQI), a rank information (RI), and a precoding matrix index (PMI)) for downlink transmissions. In some cases, the CSI-RS may be used as a reference signal for mobility measurements and radio link monitoring (RLM). Similar to the secret construction of the SSB and PDCCH as described above, a few options may exist for secret construction of the CSI-RS.

For example, a sequence used for generating the CSI-RS may be hopped over time in concert with a pseudo random sequence. Additionally or alternatively, frequency-domain tones used for the CSI-RS transmission could be hopped over time in concert with a pseudo random sequence, time-domain symbols used for the CSI-RS transmission may be hopped over time in concert with a pseudo random sequence, or both frequency-domain tones and time-domain symbols used for the CSI-RS transmission could be hopped over time in concert with a pseudo random sequence. Accordingly, based on a current 'tick' and the key sets 215 (e.g., the side information) available at UE 115-*a* and base station 105-*a*, the sequence, the frequency-domain tones, the time-domain symbols, or a combination thereof (e.g., a reference signal sequence) to be used at a next time instant (e.g., time-varying parameter) for the CSI-RS may be calculated using the output at a corresponding next 'tick' of the pseudo random sequence (e.g., the next output value). This determination of the sequence, the frequency-domain tones, the time-domain symbols, or a combination thereof for the CSI-RS transmission may protect against an attacker trying to synthesize a valid CSI-RS transmission without knowledge of the key sets 215 (e.g., the side information) used to generate the pseudo random sequence.

Similar to the options for secretly constructing the PDCCH, the different options for secretly constructing the CSI-RS transmission described above may not be mutually exclusive. For example, determining the sequence for the next occurring CSI-RS transmission may help against an attacker synthesizing a valid CSI-RS transmission. However, a MITM attacker may still drop CSI-RS transmissions from a legitimate cell if aware of the frequency-domain tones and time-domain symbols used for the CSI-RS transmissions. Accordingly, determining the frequency-domain tones, the time-domain symbols, or both for a CSI-RS transmitted at the next time instant as described above based in part on the key sets 215 may help prevent against such drops by varying the frequency-domain tones, the time-domain symbols, or both used for the CSI-RS transmissions.

In some cases, PHY layer transmission 210 may include an SRS, a PUCCH, or a RACH transmission sent from UE 115-*a* to base station 105-*a*. For example, the SRS may include a reference signal which is used by base station 105-*a* to measure a channel state (e.g., including CQI, RI, and a PMI) on uplink transmissions. Additionally, the PUCCH may be an uplink control channel used to carry acknowledgment feedback to indicate whether UE 115-*a* successfully received and decoded a downlink transmission from base station 105-*a* (e.g., hybrid access request (HARQ) acknowledgement (ACK)/negative acknowledgment (NACK) feedback), a scheduling request (SR), CSI bits, or a combination thereof (e.g., collectively referred to as uplink control information (UCI)). Additionally, the RACH transmission may be a random access channel used to access base station 105-*a* (e.g., the network, the system, etc.) via an uplink transmission.

Similar techniques used for secretly constructing the CSI-RS transmissions may be used for secretly constructing an SRS, a PUCCH, a RACH transmission, or a combination thereof. For example, a sequence for generating, frequency-domain tones, time-domain symbols, or a combination thereof used for the SRS, the PUCCH, or the RACH transmission may be hopped over time in concert with a pseudo random sequence. Accordingly, based on a current 'tick' and the key sets 215 (e.g., the side information) available at UE 115-*a* and base station 105-*a*, the sequence, the frequency-domain tones, the time-domain symbols, or a combination thereof (e.g., a reference signal sequence) to be used at a next time instant (e.g., time-varying parameter) for the SRS, the PUCCH, or the RACH transmission may be calculated using the output at a corresponding next 'tick' of the pseudo random sequence (e.g., the next output value).

This determination of the sequence for generating, the frequency-domain tones, the time-domain symbols, or a combination thereof for the SRS, the PUCCH, or the RACH transmission may protect against an attacker trying to synthesize a valid SRS, PUCCH, or RACH transmission without knowledge of the key sets 215 (e.g., the side information) used to generate the pseudo random sequence. Additionally, the different options for secretly constructing the SRS, the PUCCH, or the RACH transmission described may not be mutually exclusive.

Figure 3:
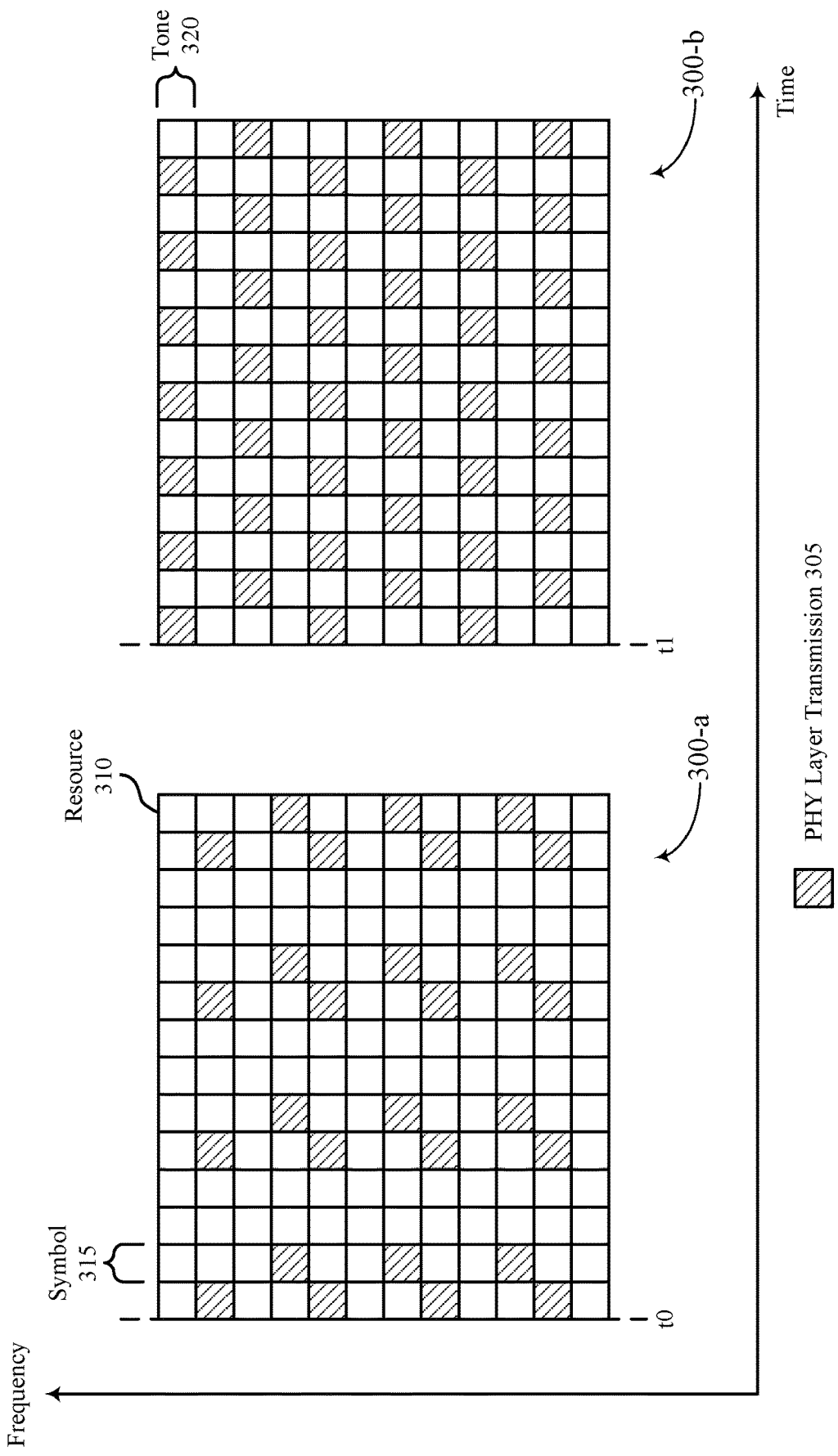
FIG. 3 illustrates examples of resource grids that support secret construction of PHY channels and signals in accordance with aspects of the present disclosure.

FIG. 3 illustrates examples of resource grids 300-*a* and 300-*b* that support secret construction of PHY channels and signals in accordance with aspects of the present disclosure. In some examples, resource grids 300-*a* and 300-*b* may implement aspects of wireless communications systems 100 and 200. For example, a UE 115 and a base station 105 may use resource grid 300-*a*, resource grid 300-*b*, or both to communicate a PHY layer channel or signal as described with reference to FIG. 2.

The resource grids 300-*a* and 300-*b* may include multiple resources 310 (e.g., time-frequency resources) that are spread across one or more symbols 315 (e.g., time-domain symbols) and one or more tones 320 (e.g., frequency-domain tones). Resource grid 300-*a* may begin at time 't0' that corresponds to a current 'tick' of a pseudo random sequence. Accordingly, the UE 115 and the base station 105 may use this current 'tick' of the pseudo random sequence in conjunction with a key set known to the UE 115 and the base station 105 (e.g., a symmetric key, a public key-private key pair, additional information, etc.) to determine one or more time-varying parameters of the PHY layer transmission 305 in resource grid 300-*b*. For example, resource grid 300-*b* may begin at a time 't1' that occurs after time 't0' of resource grid 300-*a*, where time 't1' corresponds to a next 'tick' of the pseudo random sequence (e.g., a next output value).

Subsequently, the UE 115 and the base station 105 may use this next 'tick' to calculate the time-varying parameter(s) of PHY layer transmission 305 in resource grid 300-*b*. The UE 115, the base station 105, or both may then determine whether a PHY layer transmission 305 received based on resource grid 300-*b* is legitimate (e.g., not transmitted by a FBS) based on if the calculated time-varying parameter(s) are met or used for the PHY layer transmission 305.

As described with reference to FIG. 2, a sequence, frequency-domain tones, time-domain symbols, or a combination thereof used for the PHY layer transmission 305 (e.g., or for different parts of the PHY layer transmission, such as DMRS, non-DMRS modulation symbols, mapping CCEs, etc.) may be hopped over time in concert with a pseudo random sequence. That is, based on the sequence, frequency-domain tones, time-domain symbols, or combination thereof used for the PHY layer transmission 305 in resource grid 300-*a* (e.g., a 'current' state) may correspond to a sequence, frequency-domain tones, time-domain symbols, or combination thereof used for the PHY layer transmission 305 in resource grid 300-*b* (e.g., a 'next' state). The 'current' state may be, for example, a current 'tick' number of a generator for the pseudo random sequence (e.g., a keystream or stream cipher). Additionally, the 'current' state may be shared between the UE 115 and the base station 105 a priori (e.g., during setup, call setup, etc.) or may be communicated in a current slot (e.g., in an SSB).

As shown, resources 310 used for transmitting the PHY layer transmission 305 according to resource grid 300-*a* may indicate which parameters of resources 310 (e.g., the time-varying parameters) are used for transmitting the PHY layer transmission 305 according to resource grid 300-*b*. For example, the UE 115 and the base station 105 may use information about the PHY layer transmission 305 to determine the next 'tick' of the pseudo random sequence with the key set known to the UE 115 and the base station 105 to determine the parameters of the PHY layer transmission 305 transmitted/received based on resource grid 300-*b*. The time-domain symbols for the PHY layer transmission 305 may hop over symbols 315 from resource grid 300-*a* (e.g., the current state of the pseudo random sequence) to resource grid 300-*b* (e.g., a next output value or next state of the pseudo random sequence).

Figure 4:
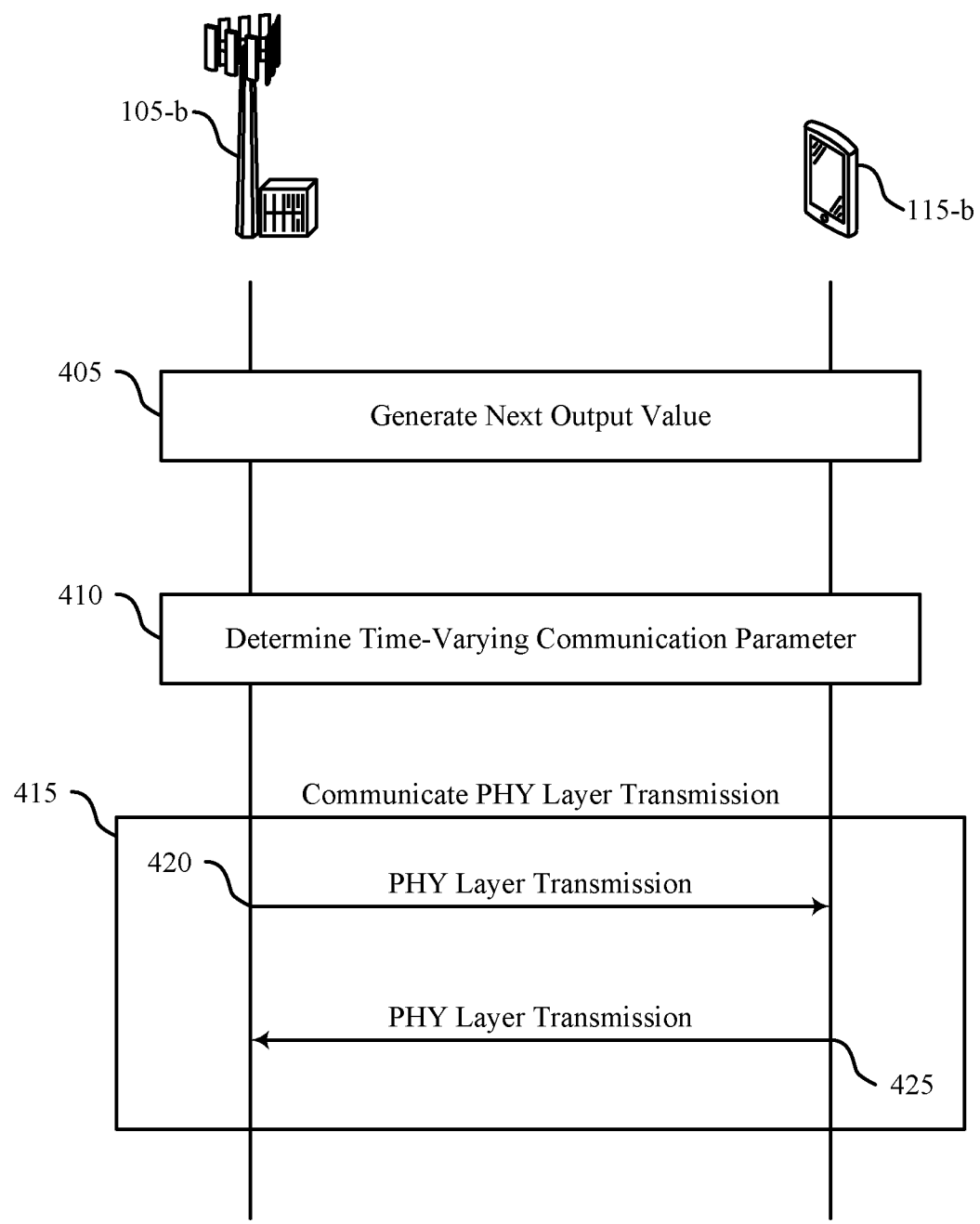
FIG. 4 illustrates an example of a process flow that supports secret construction of PHY channels and signals in accordance with aspects of the present disclosure.

FIG. 4 illustrates an example of a process flow 400 that supports secret construction of PHY channels and signals in accordance with aspects of the present disclosure. In some examples, process flow 400 may implement aspects of wireless communications systems 100 and 200. For example, process flow 400 may include a base station 105-*b* and a UE 115-*b*, which may be examples of corresponding base stations 105 and UEs 115, respectively, as described with reference to FIGS. 1-3.

In the following description of the process flow 400, the operations between UE 115-*b* and base station 105-*b* may be performed in different orders or at different times. Certain operations may also be left out of the process flow 400, or other operations may be added to the process flow 400. It is to be understood that while UE 115-*b* and base station 105-*b* are shown performing a number of the operations of the process flow 400, any wireless device may perform the operations shown.

At 405, UE 115-*b* and base station 105-*b* may generate a next output value of a pseudo random sequence generator based on a key set that is known at least in part by UE 115-*b* and base station 105-*b* (e.g., a serving base station 105). In some cases, the key set may include a symmetric key that is known by UE 115-*b* and base station 105-*b*. Additionally or alternatively, the key set may include a public key and a private key, where the public key is known by UE 115-*b* and the private key is known by base station 105-*b*, or the private key is known by UE 115-*b* and the public key is known by base station 105-*b*.

In some cases, UE 115-*b* and base station 105-*b* may generate the next output value based on a current state of the pseudo random sequence generator, the current state of the pseudo random sequence generator being known to UE 115-*b* and base station 105-*b* based on a prior communication, or a current communication, or both. Additionally, the pseudo random sequence generator may be a stream cipher.

At 410, UE 115-*b* and base station 105-*b* may determine a time-varying communication parameter based on the next output value of the pseudo random sequence generator.

At 415, UE 115-*b* may communicate a PHY layer transmission with base station 105-*b* based on the time-varying communication parameter. In some cases, UE 115-*b* and base station 105-*b* may generate a second next output value of the pseudo random sequence generator based on the key set, may determine a second time-varying communication parameter based on the second next output value of the pseudo random sequence generator, and may communicate a second PHY layer transmission based on the second time-varying communication parameter.

For example, UE 115-*b* and base station 105-*b* may communicate the PHY layer transmission based on one or more frequency domain tones indicated by the time-varying communication parameter. Additionally or alternatively, UE 115-*b* and base station 105-*b* may communicate the PHY layer transmission based on one or more time-domain symbols indicated by the time-varying communication parameter. Accordingly, UE 115-*b* and base station 105-*b* may communicate the PHY layer transmission that is an SSB, a PDCCH transmission, a PUCCH transmission, a RACH transmission, a CSI-RS, an SRS, or any combination thereof, in accordance with the one or more frequency domain tones, the one or more time-domain symbols, or both indicated by the time-varying communication parameter.

At 420, as part of communicating the PHY layer transmission, UE 115-*b* may receive (e.g., from base station 105-*b*) the PHY layer transmission that is an SSB that includes a PCI index in a PSS, an SSS, or both, where the PCI index is indicated by the time-varying communication parameter. Additionally or alternatively, UE 115-*b* may receive the PHY layer transmission that is at least a DMRS modulation symbol generated using a reference signal sequence indicated by the time-varying communication parameter. In some cases, UE 115-*b* may receive the PHY layer transmission based on a number of time-domain symbols for the PHY layer transmission indicated by the time-varying communication parameter. Additionally or alternatively, UE 115-*b* may receive the PHY layer transmission that is a CSI-RS that is generated using a reference signal sequence indicated by the time-varying communication parameter.

In some cases, UE 115-*b* may receive the PHY layer transmission that is a PDCCH transmission that is scrambled using a scrambling sequence indicated by the time-varying communication parameter. Additionally or alternatively, UE 115-*b* may receive, in accordance with a shift index indicated by the time-varying communication parameter, the PHY layer transmission that is a PDCCH transmission, the shift index indicating a mapping for at least one CCE to at least one physical resource for the PDCCH transmission. In some cases, UE 115-*b* may receive, in accordance with an interleaver size, REG bundle size, or both, indicated by the time-varying communication parameter, the PHY layer transmission that is a PDCCH transmission, where the interleaver size, REG bundle size, or both indicate a mapping for at least one CCE to at least one physical resource for the PDCCH transmission.

At 425, as part of communicating the PHY layer transmission, UE 115-*b* may transmit (e.g., to base station 105-*b*) the PHY layer transmission that is an SRS that is generated using a reference signal sequence indicated by the time-varying communication parameter. In some cases, UE 115-*b* may transmit the PHY layer transmission that is a PUCCH transmission that is generated using a reference signal sequence indicated by the time-varying communication parameter. Additionally or alternatively, UE 115-*b* may transmit the PHY layer transmission that is a RACH transmission that is generated using a reference signal sequence indicated by the time-varying communication parameter.

Figure 5:
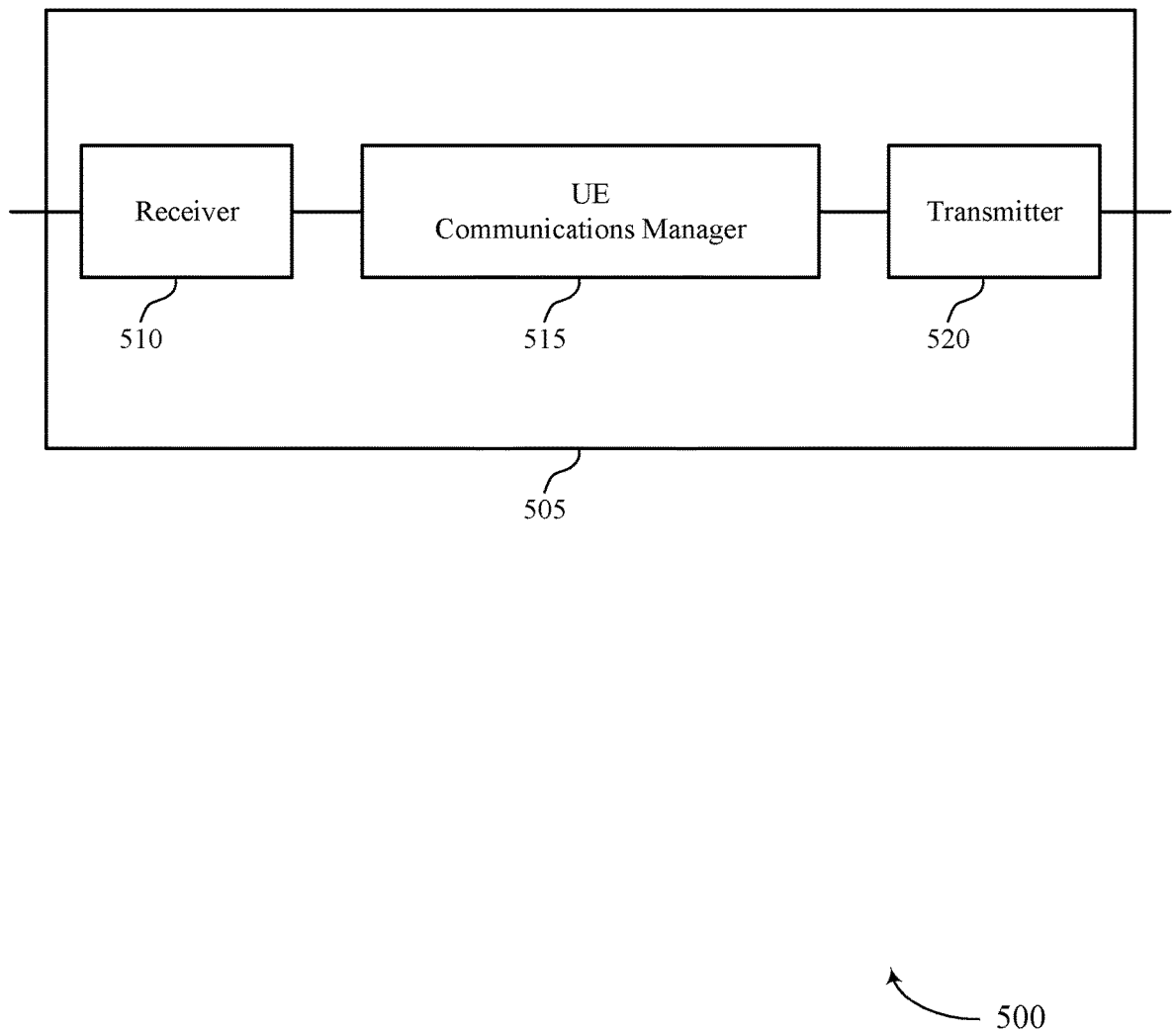
FIGS. 5 and 6 show diagrams of devices that support secret construction of PHY channels and signals in accordance with aspects of the present disclosure.

FIG. 5 shows a diagram 500 of a device 505 that supports secret construction of PHY channels and signals in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to secret construction of PHY channels and signals, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may generate a next output value of a pseudo random sequence generator based on a key set that is known at least in part by the UE and a serving base station. In some cases, the UE communications manager 515 may determine a time-varying communication parameter based on the next output value of the pseudo random sequence generator. Additionally, the UE communications manager 515 may communicate a PHY layer transmission with the serving base station based on the time-varying communication parameter. The UE communications manager 515 may be an example of aspects of the UE communications manager 810 described herein.

Based on the actions performed by the UE communications manager 515 as described herein, a UE 115 may securely transmit or receive one or more PHY layer transmissions. Accordingly, by securely transmitting/receiving the PHY layer transmission(s), the UE 115 may prevent an attacker from affecting the performance of the UE 115. For example, the attacker may use a DOS, an FBS attack, or an additional attack to prevent the UE 115 from accessing the network and receiving different communications (e.g., emergency calls, MT communications, etc.). Additionally, by preventing these attacks, the UE 115 may reduce power consumption that would result from the attacker causing the UE 115 to unnecessarily camp on an FBS, lower downlink throughputs, or perform additional actions that consume power rather than just continuing communications with a legitimate base station 105 (e.g., or another wireless communications device)

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
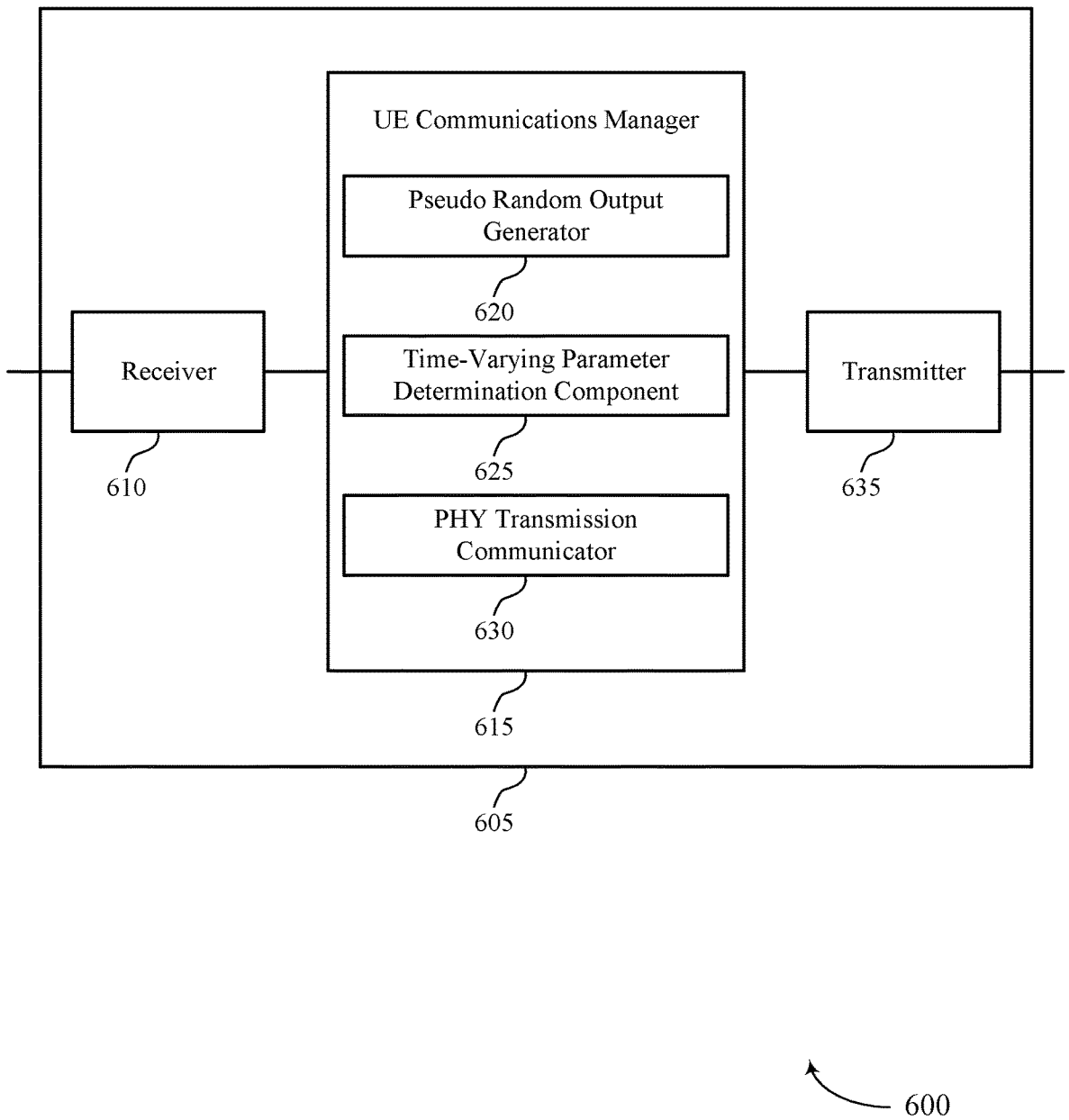

FIG. 6 shows a diagram 600 of a device 605 that supports secret construction of PHY channels and signals in accordance with aspects of the present disclosure. The device 605 may be an example of aspects of a device 505, or a UE 115 as described herein. The device 605 may include a receiver 610, a UE communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to secret construction of PHY channels and signals, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a pseudo random output generator 620, a time-varying parameter determination component 625, and a PHY transmission communicator 630. The UE communications manager 615 may be an example of aspects of the UE communications manager 810 described herein.

The pseudo random output generator 620 may generate a next output value of a pseudo random sequence generator based on a key set that is known at least in part by the UE and a serving base station.

The time-varying parameter determination component 625 may determine a time-varying communication parameter based on the next output value of the pseudo random sequence generator.

The PHY transmission communicator 630 may communicate a PHY layer transmission with the serving base station based on the time-varying communication parameter.

Based on determine a time-varying communication parameter based on a next output value of a pseudo random sequence that uses a key set, a processor of a UE 115 (e.g., controlling the receiver 610, the transmitter 635, or a transceiver 820 as described with reference to FIG. 8) may prevent attackers from falsifying PHY layer transmissions to and/or from the UE 115. For example, the time-varying communication parameter may be known to the UE 115 and a serving base station 105 alone based on the key set that is also known by the UE 115 and the serving base station 105 alone. Accordingly, if an attacker were to try and falsify the PHY layer transmission, the UE 115 may determine the falsified PHY layer transmission is not transmitted by the serving base station 105 based on the time-varying communication parameter being used for the falsified PHY layer transmission. Since the PHY layer transmissions are being transmitted/received in a more secure manner, the UE 115 may more efficiently communicate with the serving base station 105 (e.g., without using unnecessary power that would stem from the communications with the attacker or a FBS, overburdening components of the UE 115 to process communications from the attacker/FBS, etc.).

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
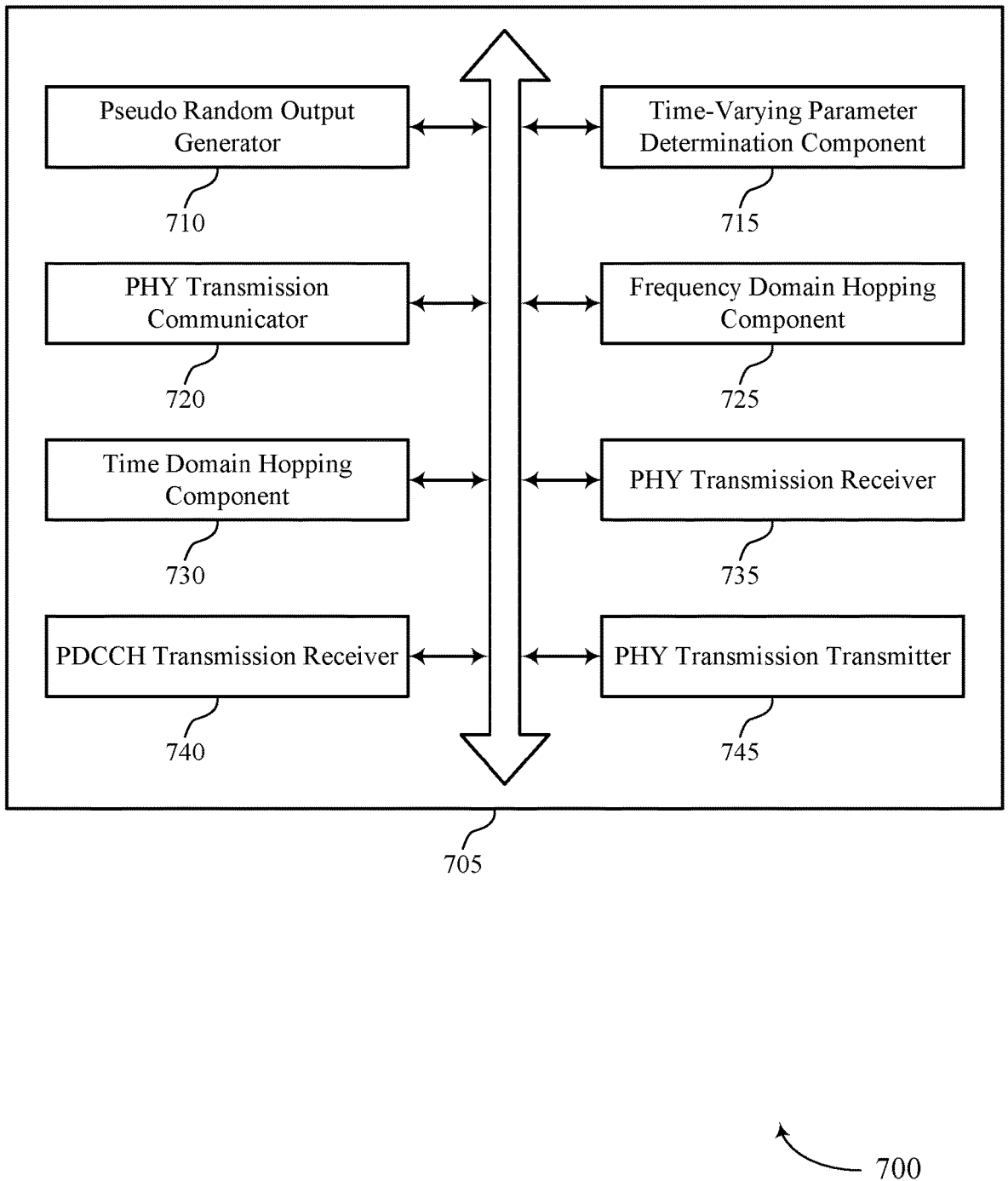
FIG. 7 shows a diagram of a UE communications manager that supports secret construction of PHY channels and signals in accordance with aspects of the present disclosure.

FIG. 7 shows a diagram 700 of a UE communications manager 705 that supports secret construction of PHY channels and signals in accordance with aspects of the present disclosure. The UE communications manager 705 may be an example of aspects of a UE communications manager 515, a UE communications manager 615, or a UE communications manager 810 described herein. The UE communications manager 705 may include a pseudo random output generator 710, a time-varying parameter determination component 715, a PHY transmission communicator 720, a frequency domain hopping component 725, a time domain hopping component 730, a PHY transmission receiver 735, a PDCCH transmission receiver 740, and a PHY transmission transmitter 745. Each of these modules may communicate, directly or indirectly, with one another (e.g., via one or more buses).

The pseudo random output generator 710 may generate a next output value of a pseudo random sequence generator based on a key set that is known at least in part by the UE and a serving base station. In some examples, the pseudo random output generator 710 may generate the next output value based on a current state of the pseudo random sequence generator, the current state of the pseudo random sequence generator being known to the UE and the serving base station based on a prior communication, or a current communication, or both. In some cases, the key set may include a symmetric key that is known by the UE and the serving base station. Additionally or alternatively, the key set may include a public key and a private key, where the public key is known by the UE and the private key is known by the serving base station, or the private key is known by the UE and the public key is known by the serving base station. In some cases, the pseudo random sequence generator may be a stream cipher.

The time-varying parameter determination component 715 may determine a time-varying communication parameter based on the next output value of the pseudo random sequence generator.

The PHY transmission communicator 720 may communicate a PHY layer transmission with the serving base station based on the time-varying communication parameter. In some examples, the PHY transmission communicator 720 may generate a second next output value of the pseudo random sequence generator based on the key set, may determine a second time-varying communication parameter based on the second next output value of the pseudo random sequence generator, and may communicate a second PHY layer transmission with the serving base station based on the second time-varying communication parameter.

The frequency domain hopping component 725 may communicate the PHY layer transmission based on one or more frequency domain tones indicated by the time-varying communication parameter. In some examples, the frequency domain hopping component 725 may communicate the PHY layer transmission that is an SSB, a PDCCH transmission, a PUCCH transmission, a RACH transmission, a CSI-RS, an SRS, or any combination thereof, in accordance with the one or more frequency domain tones indicated by the time-varying communication parameter.

The time domain hopping component 730 may communicate the PHY layer transmission based on one or more time-domain symbols indicated by the time-varying communication parameter. In some examples, the time domain hopping component 730 may communicate the PHY layer transmission that is an SSB, a PDCCH transmission, a PUCCH transmission, a RACH transmission, a CSI-RS, an SRS, or any combination thereof, in accordance with the one or more time-domain symbols indicated by the time-varying communication parameter.

The PHY transmission receiver 735 may receive the PHY layer transmission that is an SSB that includes a PCI index in a PSS, an SSS, or both, the PCI index indicated by the time-varying communication parameter. In some examples, the PHY transmission receiver 735 may receive the PHY layer transmission that is at least DMRS modulation symbol generated using a reference signal sequence indicated by the time-varying communication parameter. Additionally or alternatively, the PHY transmission receiver 735 may receive the PHY layer transmission based on a number of time-domain symbols for the PHY layer transmission indicated by the time-varying communication parameter. In some examples, the PHY transmission receiver 735 may receive the PHY layer transmission that is a CSI-RS that is generated using a reference signal sequence indicated by the time-varying communication parameter.

The PDCCH transmission receiver 740 may receive the PHY layer transmission that is a PDCCH transmission that is scrambled using a scrambling sequence indicated by the time-varying communication parameter. In some examples, the PDCCH transmission receiver 740 may receive, in accordance with a shift index indicated by the time-varying communication parameter, the PHY layer transmission that is a PDCCH transmission, the shift index indicating a mapping for at least one CCE to at least one PHY resource for the PDCCH transmission. Additionally or alternatively, the PDCCH transmission receiver 740 may receive, in accordance with an interleaver size, REG bundle size, or both, indicated by the time-varying communication parameter, the PHY layer transmission that is a PDCCH transmission, the interleaver size, REG bundle size, or both indicating a mapping for at least one CCE to at least one PHY resource for the PDCCH transmission.

The PHY transmission transmitter 745 may transmit the PHY layer transmission that is an SRS that is generated using a reference signal sequence indicated by the time-varying communication parameter. In some examples, the PHY transmission transmitter 745 may transmit the PHY layer transmission that is a PUCCH transmission that is generated using a reference signal sequence indicated by the time-varying communication parameter. Additionally or alternatively, the PHY transmission transmitter 745 may transmit the PHY layer transmission that is a RACH transmission that is generated using a reference signal sequence indicated by the time-varying communication parameter.

Figure 8:
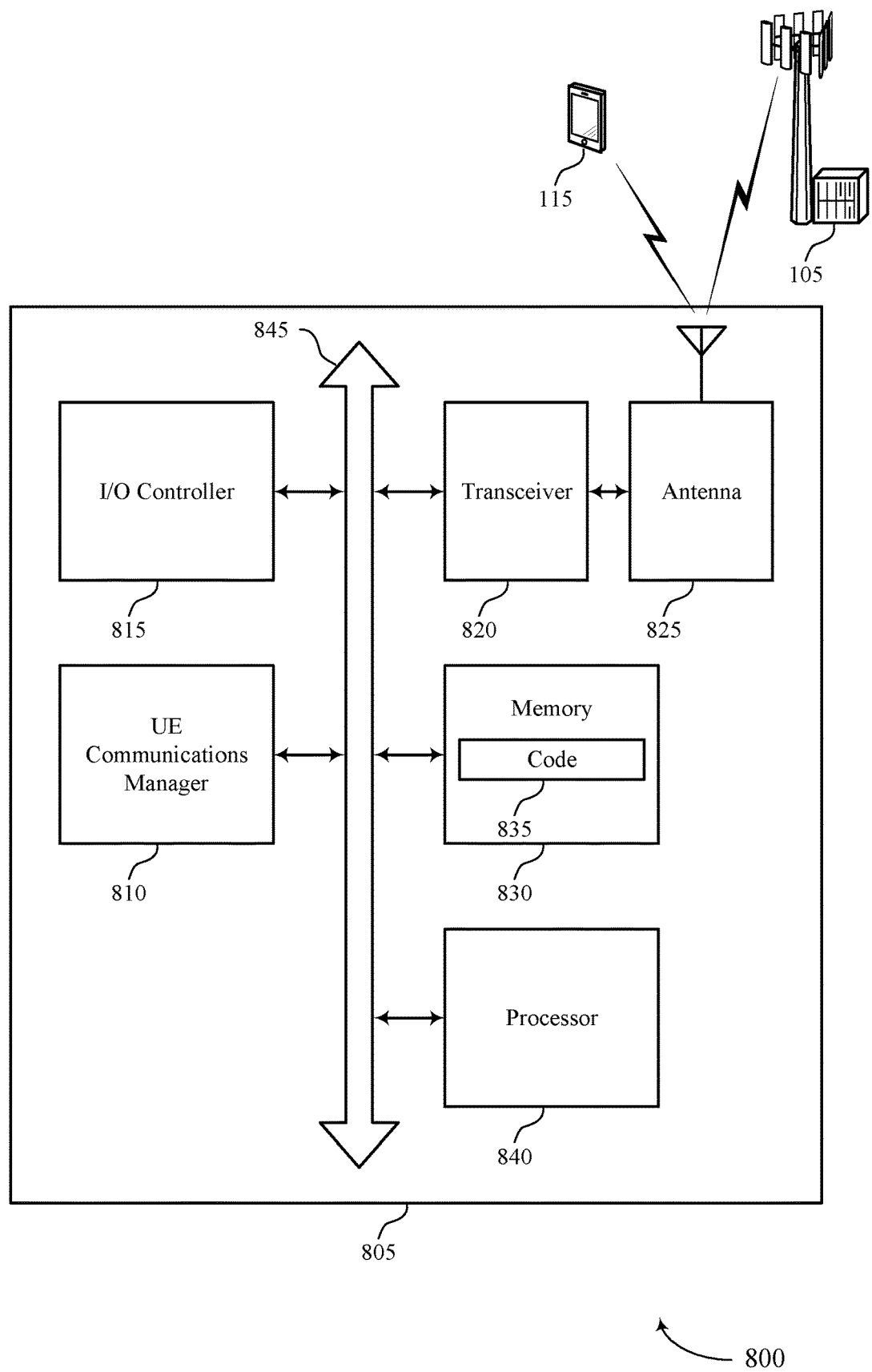
FIG. 8 shows a diagram of a system including a device that supports secret construction of PHY channels and signals in accordance with aspects of the present disclosure.

FIG. 8 shows a diagram of a system 800 including a device 805 that supports secret construction of PHY channels and signals in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may generate a next output value of a pseudo random sequence generator based on a key set that is known at least in part by the UE and a serving base station. In some cases, the UE communications manager 810 may determine a time-varying communication parameter based on the next output value of the pseudo random sequence generator. Additionally, the UE communications manager 810 may communicate a PHY layer transmission with the serving base station based on the time-varying communication parameter.

The I/O controller 815 may manage input and output signals for the device 805. The I/O controller 815 may also manage peripherals not integrated into the device 805. In some cases, the I/O controller 815 may represent a PHY connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting secret construction of PHY channels and signals).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
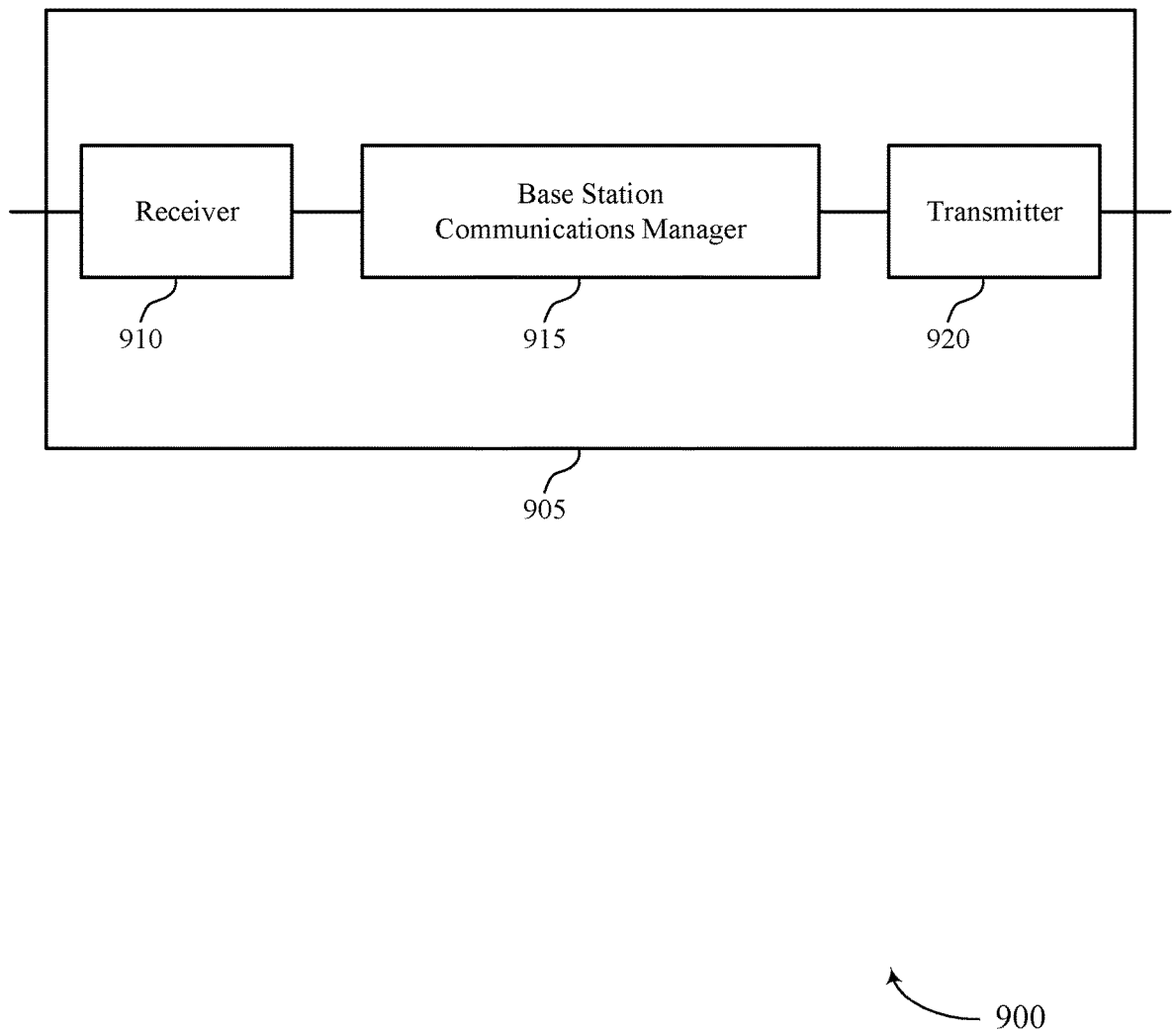
FIGS. 9 and 10 show diagrams of devices that support secret construction of PHY channels and signals in accordance with aspects of the present disclosure.

FIG. 9 shows a diagram 900 of a device 905 that supports secret construction of PHY channels and signals in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to secret construction of PHY channels and signals, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may generate a next output value of a pseudo random sequence generator based on a key set that is known at least in part by a UE and the base station. In some cases, the base station communications manager 915 may determine a time-varying communication parameter based on the next output value of the pseudo random sequence generator. Additionally, the base station communications manager 915 may communicate a PHY layer transmission with the UE based on the time-varying communication parameter. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
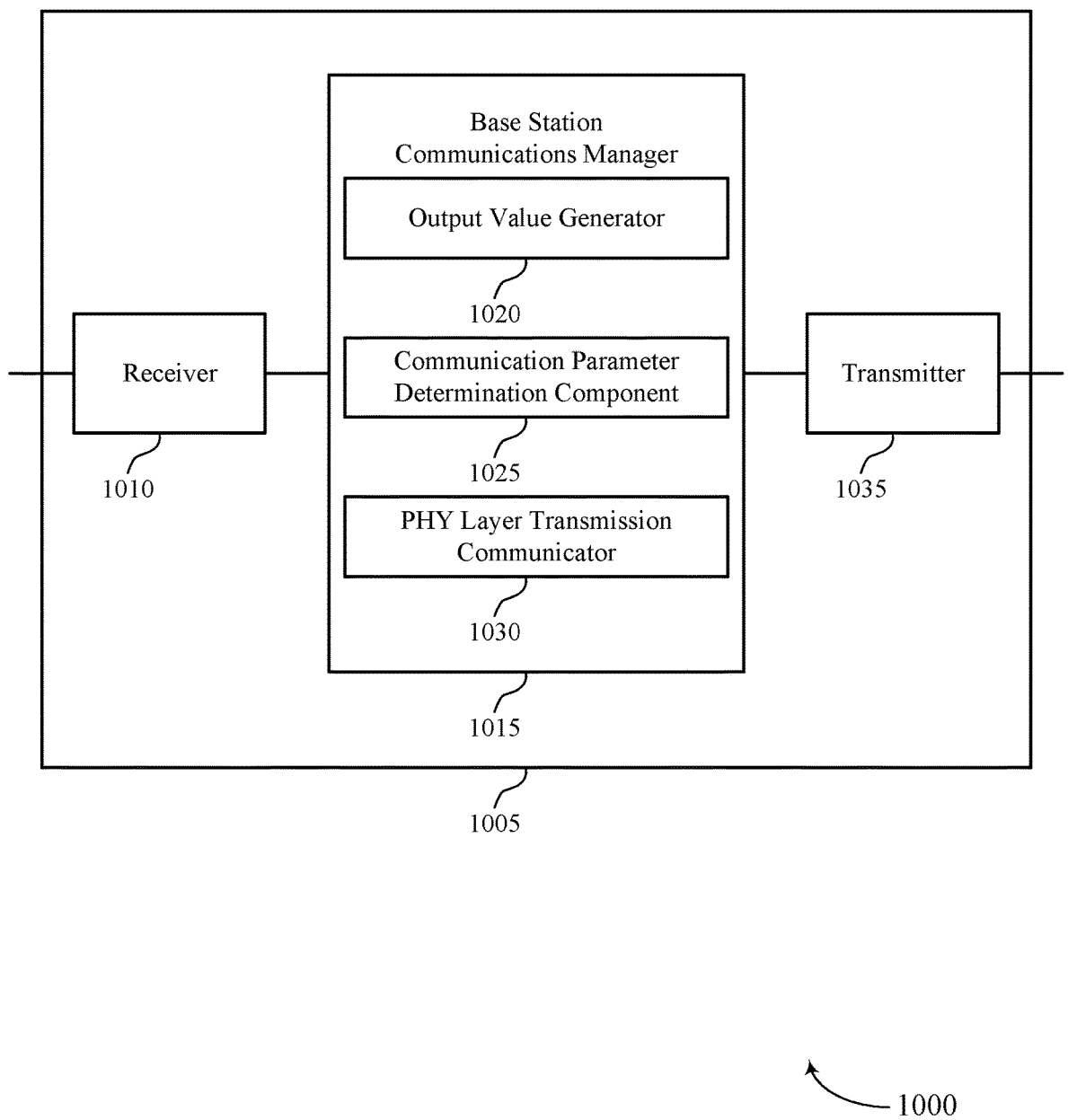

FIG. 10 shows a diagram 1000 of a device 1005 that supports secret construction of PHY channels and signals in accordance with aspects of the present disclosure. The device 1005 may be an example of aspects of a device 905, or a base station 105 as described herein. The device 1005 may include a receiver 1010, a base station communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to secret construction of PHY channels and signals, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include an output value generator 1020, a communication parameter determination component 1025, and a PHY layer transmission communicator 1030. The base station communications manager 1015 may be an example of aspects of the base station communications manager 1210 described herein.

The output value generator 1020 may generate a next output value of a pseudo random sequence generator based on a key set that is known at least in part by a UE and the base station.

The communication parameter determination component 1025 may determine a time-varying communication parameter based on the next output value of the pseudo random sequence generator.

The PHY layer transmission communicator 1030 may communicate a PHY layer transmission with the UE based on the time-varying communication parameter.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
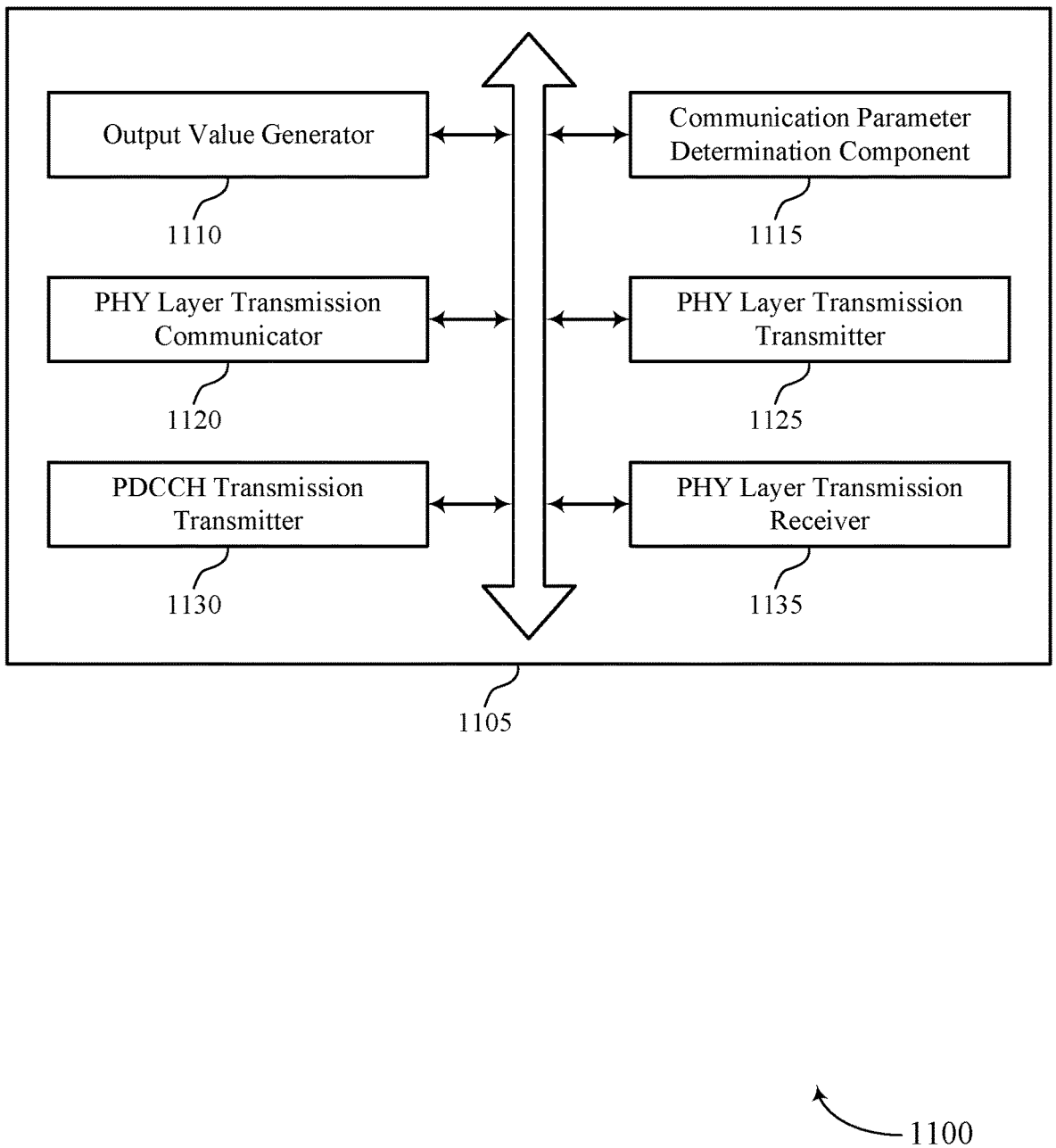
FIG. 11 shows a diagram of a base station communications manager that supports secret construction of PHY channels and signals in accordance with aspects of the present disclosure.

FIG. 11 shows a diagram 1100 of a base station communications manager 1105 that supports secret construction of PHY channels and signals in accordance with aspects of the present disclosure. The base station communications manager 1105 may be an example of aspects of a base station communications manager 915, a base station communications manager 1015, or a base station communications manager 1210 described herein. The base station communications manager 1105 may include an output value generator 1110, a communication parameter determination component 1115, a PHY layer transmission communicator 1120, a PHY layer transmission transmitter 1125, a PDCCH transmission transmitter 1130, and a PHY layer transmission receiver 1135. Each of these modules may communicate, directly or indirectly, with one another (e.g., via one or more buses).

The output value generator 1110 may generate a next output value of a pseudo random sequence generator based on a key set that is known at least in part by a UE and the base station. In some examples, the output value generator 1110 may generate the next output value based on a current state of the pseudo random sequence generator, the current state of the pseudo random sequence generator being known to the UE and the base station based on a prior communication, or a current communication, or both. In some cases, the key set may include a symmetric key that is known by the UE and the serving base station. Additionally or alternatively, the key set may include a public key and a private key, where the public key is known by the UE and the private key is known by the base station, or the private key is known by the UE and the public key is known by the base station. In some cases, the pseudo random sequence generator may be a stream cipher.

The communication parameter determination component 1115 may determine a time-varying communication parameter based on the next output value of the pseudo random sequence generator.

The PHY layer transmission communicator 1120 may communicate a PHY layer transmission with the UE based on the time-varying communication parameter. In some cases, the PHY layer transmission communicator 1120 may generate a second next output value of the pseudo random sequence generator based on the key set, may determine a second time-varying communication parameter based on the second next output value of the pseudo random sequence generator, and may communicate a second PHY layer transmission with the UE based on the second time-varying communication parameter.

In some examples, the PHY layer transmission communicator 1120 may communicate the PHY layer transmission based on one or more frequency domain tones indicated by the time-varying communication parameter. For example, the PHY layer transmission communicator 1120 may communicate the PHY layer transmission that is an SSB, a PDCCH transmission, a PUCCH transmission, a RACH transmission, a CSI-RS, an SRS, or any combination thereof, in accordance with the one or more frequency domain tones indicated by the time-varying communication parameter.

Additionally or alternatively, the PHY layer transmission communicator 1120 may communicate the PHY layer transmission based on one or more time-domain symbols indicated by the time-varying communication parameter. For example, the PHY layer transmission communicator 1120 may communicate the PHY layer transmission that is an SSB, a PDCCH transmission, a PUCCH transmission, a RACH transmission, a CSI-RS, an SRS, or any combination thereof, in accordance with the one or more time-domain symbols indicated by the time-varying communication parameter.

The PHY layer transmission transmitter 1125 may transmit the PHY layer transmission that is an SSB that includes a PCI index in a PSS, an SSS, or both, the PCI index indicated by the time-varying communication parameter. In some examples, the PHY layer transmission transmitter 1125 may transmit the PHY layer transmission that is at least DMRS modulation symbol generated using a reference signal sequence indicated by the time-varying communication parameter. Additionally or alternatively, the PHY layer transmission transmitter 1125 may transmit the PHY layer transmission based on a number of time-domain symbols for the PHY layer transmission indicated by the time-varying communication parameter. In some examples, the PHY layer transmission transmitter 1125 may transmit the PHY layer transmission that is a CSI-RS that is generated using a reference signal sequence indicated by the time-varying communication parameter.

The PDCCH transmission transmitter 1130 may transmit the PHY layer transmission that is a PDCCH transmission that is scrambled using a scrambling sequence indicated by the time-varying communication parameter. In some examples, the PDCCH transmission transmitter 1130 may transmit, in accordance with a shift index indicated by the time-varying communication parameter, the PHY layer transmission that is a PDCCH transmission, the shift index indicating a mapping for at least one CCE to at least one PHY resource for the PDCCH transmission. Additionally or alternatively, the PDCCH transmission transmitter 1130 may transmit, in accordance with an interleaver size, REG bundle size, or both, indicated by the time-varying communication parameter, the PHY layer transmission that is a PDCCH transmission, the interleaver size, REG bundle size, or both indicating a mapping for at least one CCE to at least one PHY resource for the PDCCH transmission.

The PHY layer transmission receiver 1135 may receive the PHY layer transmission that is an SRS that is generated using a reference signal sequence indicated by the time-varying communication parameter. In some examples, the PHY layer transmission receiver 1135 may receive the PHY layer transmission that is a PUCCH transmission that is generated using a reference signal sequence indicated by the time-varying communication parameter. Additionally or alternatively, the PHY layer transmission receiver 1135 may receive the PHY layer transmission that is a RACH transmission that is generated using a reference signal sequence indicated by the time-varying communication parameter.

Figure 12:
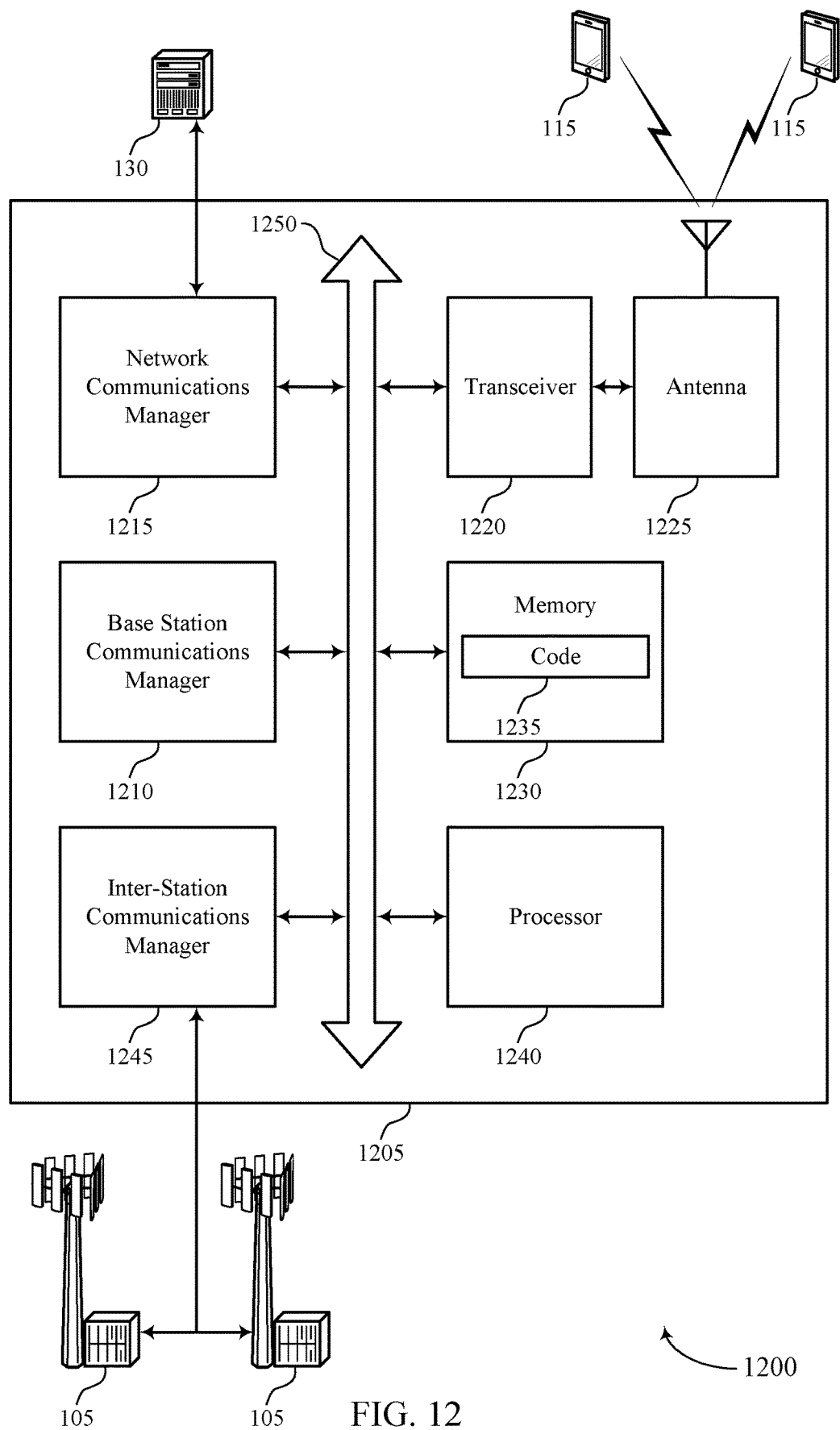
FIG. 12 shows a diagram of a system including a device that supports secret construction of PHY channels and signals in accordance with aspects of the present disclosure.

FIG. 12 shows a diagram of a system 1200 including a device 1205 that supports secret construction of PHY channels and signals in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may generate a next output value of a pseudo random sequence generator based on a key set that is known at least in part by a UE and the base station. In some cases, the base station communications manager 1210 may determine a time-varying communication parameter based on the next output value of the pseudo random sequence generator. Additionally, the base station communications manager 1210 may communicate a PHY layer transmission with the UE based on the time-varying communication parameter.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting secret construction of PHY channels and signals).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
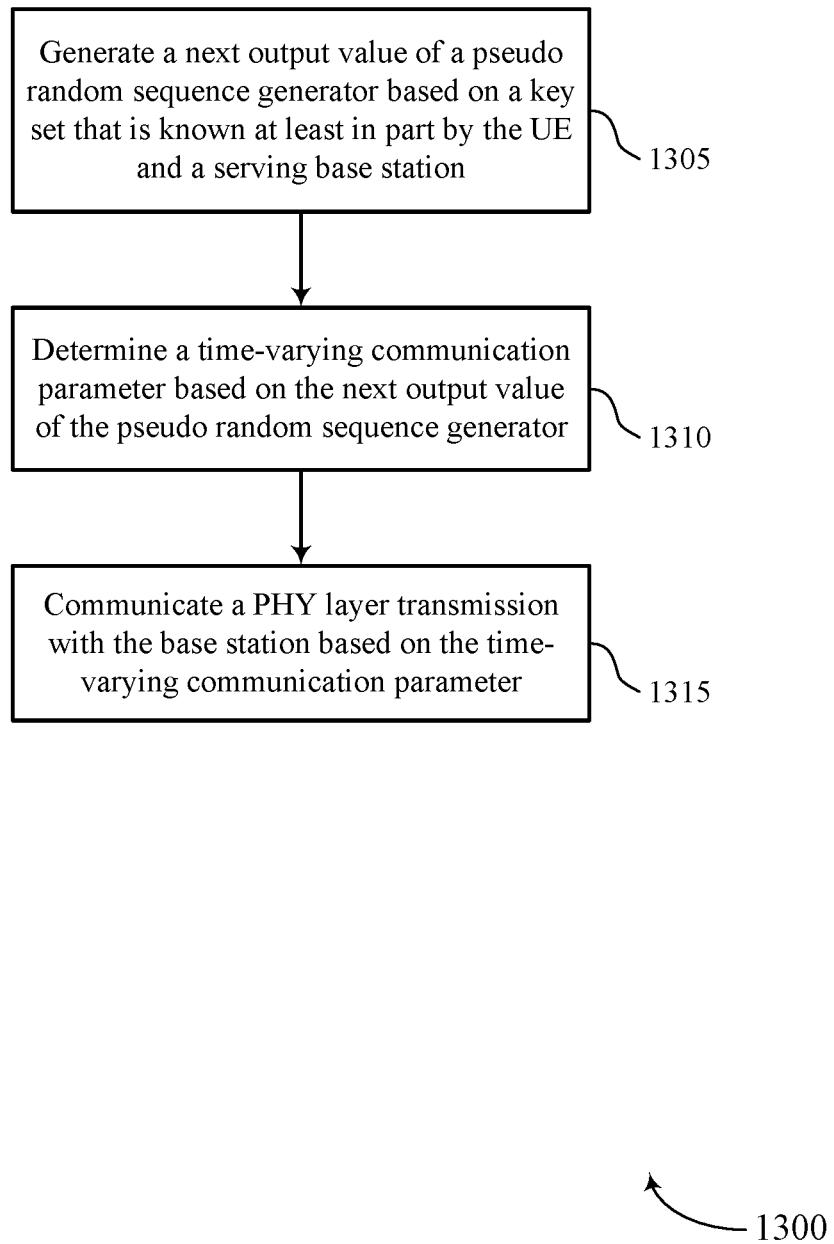
FIGS. 13 through 17 show flowcharts illustrating methods that support secret construction of PHY channels and signals in accordance with aspects of the present disclosure.

FIG. 13 shows a flowchart illustrating a method 1300 that supports secret construction of PHY channels and signals in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may generate a next output value of a pseudo random sequence generator based on a key set that is known at least in part by the UE and a serving base station. The operations of 1305 may be performed according to the methods described herein. In some examples, aspects of the operations of 1305 may be performed by a pseudo random output generator as described with reference to FIGS. 5 through 8.

At 1310, the UE may determine a time-varying communication parameter based on the next output value of the pseudo random sequence generator. The operations of 1310 may be performed according to the methods described herein. In some examples, aspects of the operations of 1310 may be performed by a time-varying parameter determination component as described with reference to FIGS. 5 through 8.

At 1315, the UE may communicate a PHY layer transmission with the serving base station based on the time-varying communication parameter. The operations of 1315 may be performed according to the methods described herein. In some examples, aspects of the operations of 1315 may be performed by a PHY transmission communicator as described with reference to FIGS. 5 through 8.

Figure 14:
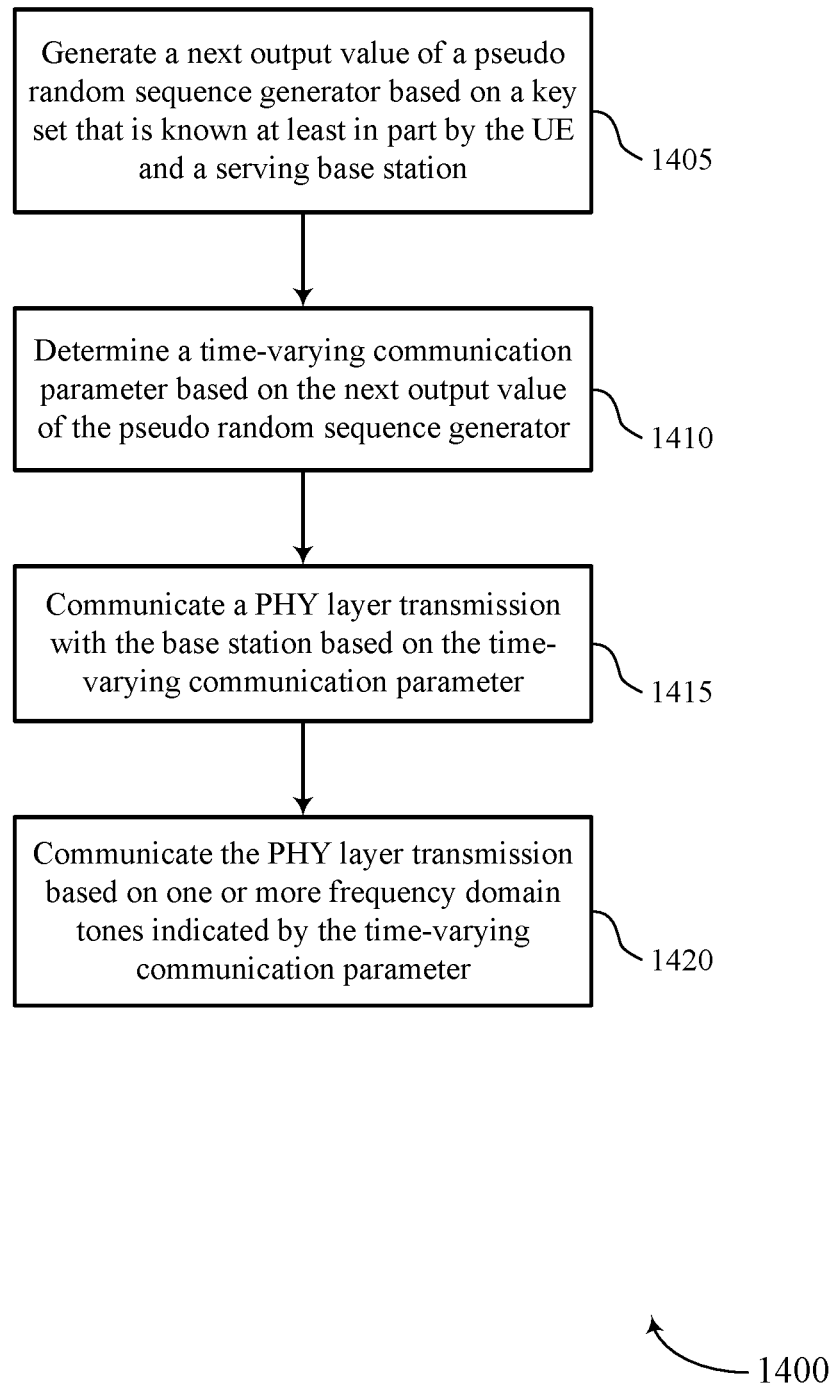

FIG. 14 shows a flowchart illustrating a method 1400 that supports secret construction of PHY channels and signals in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may generate a next output value of a pseudo random sequence generator based on a key set that is known at least in part by the UE and a serving base station. The operations of 1405 may be performed according to the methods described herein. In some examples, aspects of the operations of 1405 may be performed by a pseudo random output generator as described with reference to FIGS. 5 through 8.

At 1410, the UE may determine a time-varying communication parameter based on the next output value of the pseudo random sequence generator. The operations of 1410 may be performed according to the methods described herein. In some examples, aspects of the operations of 1410 may be performed by a time-varying parameter determination component as described with reference to FIGS. 5 through 8.

At 1415, the UE may communicate a PHY layer transmission with the serving base station based on the time-varying communication parameter. The operations of 1415 may be performed according to the methods described herein. In some examples, aspects of the operations of 1415 may be performed by a PHY transmission communicator as described with reference to FIGS. 5 through 8.

At 1420, the UE may communicate the PHY layer transmission based on one or more frequency domain tones indicated by the time-varying communication parameter. The operations of 1420 may be performed according to the methods described herein. In some examples, aspects of the operations of 1420 may be performed by a frequency domain hopping component as described with reference to FIGS. 5 through 8.

Figure 15:
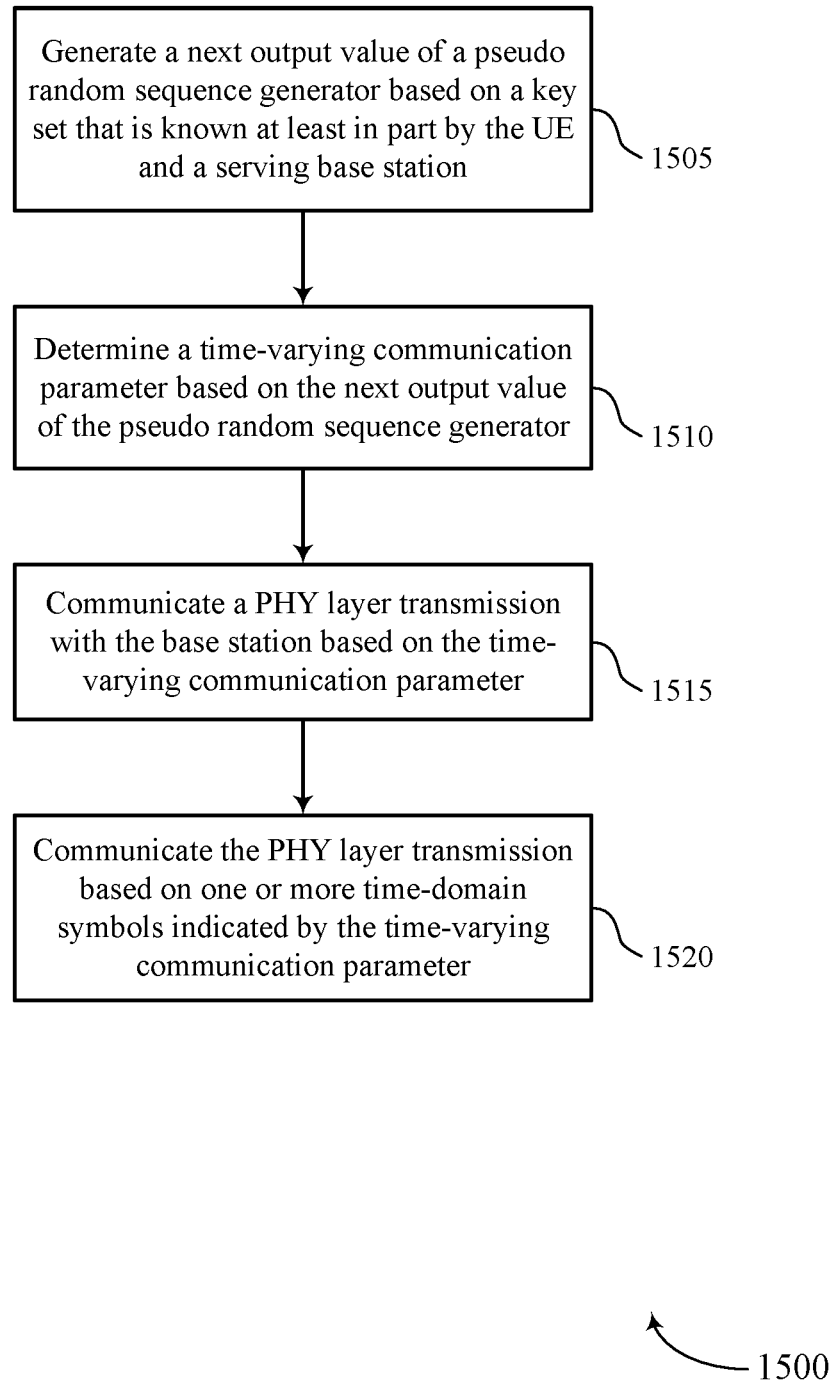

FIG. 15 shows a flowchart illustrating a method 1500 that supports secret construction of PHY channels and signals in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may generate a next output value of a pseudo random sequence generator based on a key set that is known at least in part by the UE and a serving base station. The operations of 1505 may be performed according to the methods described herein. In some examples, aspects of the operations of 1505 may be performed by a pseudo random output generator as described with reference to FIGS. 5 through 8.

At 1510, the UE may determine a time-varying communication parameter based on the next output value of the pseudo random sequence generator. The operations of 1510 may be performed according to the methods described herein. In some examples, aspects of the operations of 1510 may be performed by a time-varying parameter determination component as described with reference to FIGS. 5 through 8.

At 1515, the UE may communicate a PHY layer transmission with the serving base station based on the time-varying communication parameter. The operations of 1515 may be performed according to the methods described herein. In some examples, aspects of the operations of 1515 may be performed by a PHY transmission communicator as described with reference to FIGS. 5 through 8.

At 1520, the UE may communicate the PHY layer transmission based on one or more time-domain symbols indicated by the time-varying communication parameter. The operations of 1520 may be performed according to the methods described herein. In some examples, aspects of the operations of 1520 may be performed by a time domain hopping component as described with reference to FIGS. 5 through 8.

Figure 16:
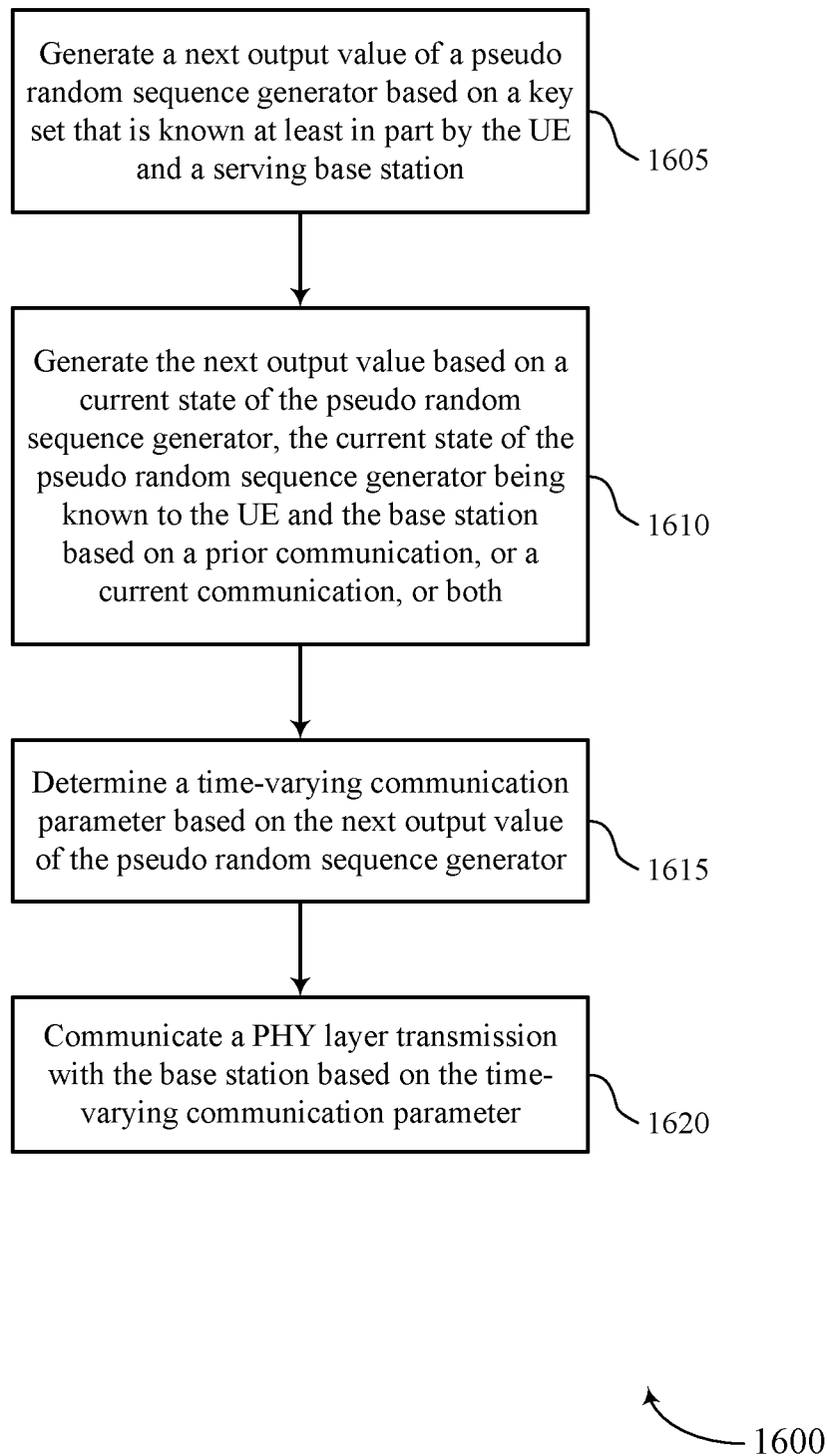

FIG. 16 shows a flowchart illustrating a method 1600 that supports secret construction of PHY channels and signals in accordance with aspects of the present disclosure. The operations of method 1600 may be implemented by a UE 115 or its components as described herein. For example, the operations of method 1600 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may generate a next output value of a pseudo random sequence generator based on a key set that is known at least in part by the UE and a serving base station. The operations of 1605 may be performed according to the methods described herein. In some examples, aspects of the operations of 1605 may be performed by a pseudo random output generator as described with reference to FIGS. 5 through 8.

At 1610, the UE may generate the next output value based on a current state of the pseudo random sequence generator, the current state of the pseudo random sequence generator being known to the UE and the serving base station based on a prior communication, or a current communication, or both. The operations of 1610 may be performed according to the methods described herein. In some examples, aspects of the operations of 1610 may be performed by a pseudo random output generator as described with reference to FIGS. 5 through 8.

At 1615, the UE may determine a time-varying communication parameter based on the next output value of the pseudo random sequence generator. The operations of 1615 may be performed according to the methods described herein. In some examples, aspects of the operations of 1615 may be performed by a time-varying parameter determination component as described with reference to FIGS. 5 through 8.

At 1620, the UE may communicate a PHY layer transmission with the serving base station based on the time-varying communication parameter. The operations of 1620 may be performed according to the methods described herein. In some examples, aspects of the operations of 1620 may be performed by a PHY transmission communicator as described with reference to FIGS. 5 through 8.

Figure 17:
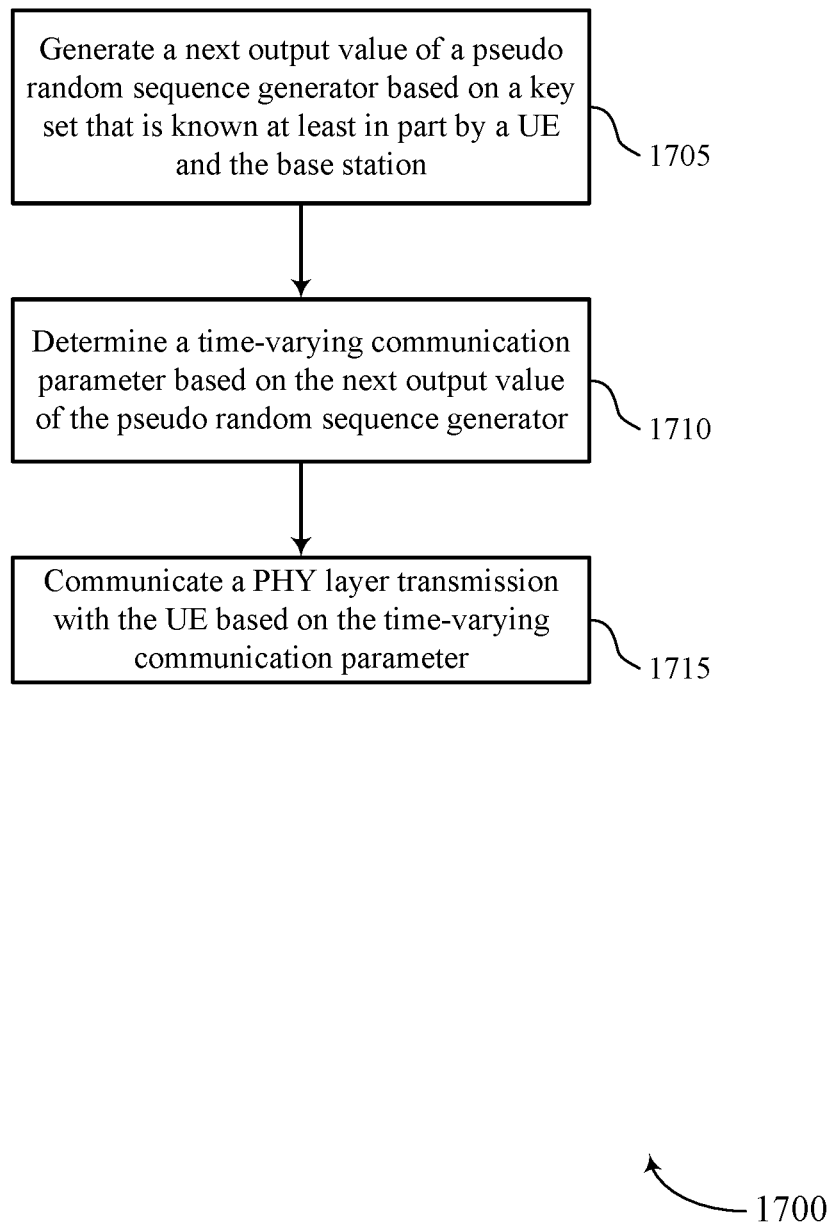

FIG. 17 shows a flowchart illustrating a method 1700 that supports secret construction of PHY channels and signals in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may generate a next output value of a pseudo random sequence generator based on a key set that is known at least in part by a UE and the base station. The operations of 1705 may be performed according to the methods described herein. In some examples, aspects of the operations of 1705 may be performed by an output value generator as described with reference to FIGS. 9 through 12.

At 1710, the base station may determine a time-varying communication parameter based on the next output value of the pseudo random sequence generator. The operations of 1710 may be performed according to the methods described herein. In some examples, aspects of the operations of 1710 may be performed by a communication parameter determination component as described with reference to FIGS. 9 through 12.

At 1715, the base station may communicate a PHY layer transmission with the UE based on the time-varying communication parameter. The operations of 1715 may be performed according to the methods described herein. In some examples, aspects of the operations of 1715 may be performed by a PHY layer transmission communicator as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications by a UE, comprising: generating a next output value of a pseudo random sequence generator based at least in part on a key set that is known at least in part by the UE and a serving base station; determining a time-varying communication parameter based at least in part on the next output value of the pseudo random sequence generator; and communicating a physical layer transmission with the serving base station based at least in part on the time-varying communication parameter.

Aspect 2: The method of aspect 1, wherein communicating the physical layer transmission comprises: communicating the physical layer transmission based at least in part on one or more frequency domain tones indicated by the time-varying communication parameter.

Aspect 3: The method of aspect 2, wherein communicating the physical layer transmission comprises: communicating the physical layer transmission that is a synchronization signal block, a physical downlink control channel transmission, a physical uplink control channel transmission, a random access channel transmission, a channel state information reference signal, a sounding reference signal, or any combination thereof, in accordance with the one or more frequency domain tones indicated by the time-varying communication parameter.

Aspect 4: The method of any of aspects 1 through 3, wherein communicating the physical layer transmission comprises: communicating the physical layer transmission based at least in part on one or more time-domain symbols indicated by the time-varying communication parameter.

Aspect 5: The method of aspect 4, further comprising: communicating the physical layer transmission that is a synchronization signal block, a physical downlink control channel transmission, a physical uplink control channel transmission, a random access channel transmission, a channel state information reference signal, a sounding reference signal, or any combination thereof, in accordance with the one or more time-domain symbols indicated by the time-varying communication parameter.

Aspect 6: The method of any of aspects 1 through 5, wherein the key set comprises a symmetric key that is known by the UE and the serving base station.

Aspect 7: The method of any of aspects 1 through 6, wherein the key set comprises a public key and a private key, the public key is known by the UE and the private key is known by the serving base station, or the private key is known by the UE and the public key is known by the serving base station.

Aspect 8: The method of any of aspects 1 through 7, wherein generating the next output value comprises: generating the next output value based at least in part on a current state of the pseudo random sequence generator, the current state of the pseudo random sequence generator being known to the UE and the serving base station based at least in part on a prior communication, or a current communication, or both.

Aspect 9: The method of any of aspects 1 through 8, wherein communicating the physical layer transmission comprises: receiving the physical layer transmission that is a synchronization signal block that includes a physical cell identifier index in a primary synchronization signal, a secondary synchronization signal, or both, the physical cell identifier index indicated by the time-varying communication parameter.

Aspect 10: The method of any of aspects 1 through 9, wherein communicating the physical layer transmission comprises: receiving the physical layer transmission that is at least demodulation reference signal modulation symbol generated using a reference signal sequence indicated by the time-varying communication parameter.

Aspect 11: The method of any of aspects 1 through 10, wherein communicating the physical layer transmission comprises: receiving the physical layer transmission that is a physical downlink control channel transmission that is scrambled using a scrambling sequence indicated by the time-varying communication parameter.

Aspect 12: The method of any of aspects 1 through 11, wherein communicating the physical layer transmission comprises: receiving, in accordance with a shift index indicated by the time-varying communication parameter, the physical layer transmission that is a physical downlink control channel transmission, the shift index indicating a mapping for at least one control channel element to at least one physical resource for the physical downlink control channel transmission.

Aspect 13: The method of any of aspects 1 through 12, wherein communicating the physical layer transmission comprises: receiving, in accordance with an interleaver size, resource element group bundle size, or both, indicated by the time-varying communication parameter, the physical layer transmission that is a physical downlink control channel transmission, the interleaver size, resource element group bundle size, or both indicating a mapping for at least one control channel element to at least one physical resource for the physical downlink control channel transmission.

Aspect 14: The method of any of aspects 1 through 13, wherein communicating the physical layer transmission comprises: receiving the physical layer transmission based at least in part on a number of time-domain symbols for the physical layer transmission indicated by the time-varying communication parameter.

Aspect 15: The method of any of aspects 1 through 14, wherein communicating the physical layer transmission comprises: receiving the physical layer transmission that is a channel state information reference signal that is generated using a reference signal sequence indicated by the time-varying communication parameter.

Aspect 16: The method of any of aspects 1 through 15, wherein communicating the physical layer transmission comprises: transmitting the physical layer transmission that is a sounding reference signal that is generated using a reference signal sequence indicated by the time-varying communication parameter.

Aspect 17: The method of any of aspects 1 through 16, wherein communicating the physical layer transmission comprises: transmitting the physical layer transmission that is a physical uplink control channel transmission that is generated using a reference signal sequence indicated by the time-varying communication parameter.

Aspect 18: The method of any of aspects 1 through 17, wherein communicating the physical layer transmission comprises: transmitting the physical layer transmission that is a random access channel transmission that is generated using a reference signal sequence indicated by the time-varying communication parameter.

Aspect 19: The method of any of aspects 1 through 18, further comprising: generating a second next output value of the pseudo random sequence generator based at least in part on the key set; determining a second time-varying communication parameter based at least in part on the second next output value of the pseudo random sequence generator; and communicating a second physical layer transmission with the serving base station based at least in part on the second time-varying communication parameter.

Aspect 20: The method of any of aspects 1 through 19, wherein the pseudo random sequence generator is a stream cipher.

Aspect 21: A method for wireless communications by a base station, comprising: generating a next output value of a pseudo random sequence generator based at least in part on a key set that is known at least in part by a UE and the base station; determining a time-varying communication parameter based at least in part on the next output value of the pseudo random sequence generator; and communicating a physical layer transmission with the UE based at least in part on the time-varying communication parameter.

Aspect 22: The method of aspect 21, wherein communicating the physical layer transmission comprises: communicating the physical layer transmission based at least in part on one or more frequency domain tones indicated by the time-varying communication parameter.

Aspect 23: The method of aspect 22, wherein communicating the physical layer transmission comprises: communicating the physical layer transmission that is a synchronization signal block, a physical downlink control channel transmission, a physical uplink control channel transmission, a random access channel transmission, a channel state information reference signal, a sounding reference signal, or any combination thereof, in accordance with the one or more frequency domain tones indicated by the time-varying communication parameter.

Aspect 24: The method of any of aspects 21 through 23, wherein communicating the physical layer transmission comprises: communicating the physical layer transmission based at least in part on one or more time-domain symbols indicated by the time-varying communication parameter.

Aspect 25: The method of aspect 24, further comprising: communicating the physical layer transmission that is a synchronization signal block, a physical downlink control channel transmission, a physical uplink control channel transmission, a random access channel transmission, a channel state information reference signal, a sounding reference signal, or any combination thereof, in accordance with the one or more time-domain symbols indicated by the time-varying communication parameter.

Aspect 26: The method of any of aspects 21 through 25, wherein the key set comprises a symmetric key that is known by the UE and the base station.

Aspect 27: The method of any of aspects 21 through 26, wherein the key set comprises a public key and a private key, the public key is known by the UE and the private key is known by the base station, or the private key is known by the UE and the public key is known by the base station.

Aspect 28: The method of any of aspects 21 through 27, wherein generating the next output value comprises: generating the next output value based at least in part on a current state of the pseudo random sequence generator, the current state of the pseudo random sequence generator being known to the UE and the base station based at least in part on a prior communication, or a current communication, or both.

Aspect 29: The method of any of aspects 21 through 28, wherein communicating the physical layer transmission comprises: transmitting the physical layer transmission that is a synchronization signal block that includes a physical cell identifier index in a primary synchronization signal, a secondary synchronization signal, or both, the physical cell identifier index indicated by the time-varying communication parameter.

Aspect 30: The method of any of aspects 21 through 29, wherein communicating the physical layer transmission comprises: transmitting the physical layer transmission that is at least demodulation reference signal modulation symbol generated using a reference signal sequence indicated by the time-varying communication parameter.

Aspect 31: The method of any of aspects 21 through 30, wherein communicating the physical layer transmission comprises: transmitting the physical layer transmission that is a physical downlink control channel transmission that is scrambled using a scrambling sequence indicated by the time-varying communication parameter.

Aspect 32: The method of any of aspects 21 through 31, wherein communicating the physical layer transmission comprises: transmitting, in accordance with a shift index indicated by the time-varying communication parameter, the physical layer transmission that is a physical downlink control channel transmission, the shift index indicating a mapping for at least one control channel element to at least one physical resource for the physical downlink control channel transmission.

Aspect 33: The method of any of aspects 21 through 32, wherein communicating the physical layer transmission comprises: transmitting, in accordance with an interleaver size, resource element group bundle size, or both, indicated by the time-varying communication parameter, the physical layer transmission that is a physical downlink control channel transmission, the interleaver size, resource element group bundle size, or both indicating a mapping for at least one control channel element to at least one physical resource for the physical downlink control channel transmission.

Aspect 34: The method of any of aspects 21 through 33, wherein communicating the physical layer transmission comprises: transmitting the physical layer transmission based at least in part on a number of time-domain symbols for the physical layer transmission indicated by the time-varying communication parameter.

Aspect 35: The method of any of aspects 21 through 34, wherein communicating the physical layer transmission comprises: transmitting the physical layer transmission that is a channel state information reference signal that is generated using a reference signal sequence indicated by the time-varying communication parameter.

Aspect 36: The method of any of aspects 21 through 35, wherein communicating the physical layer transmission comprises: receiving the physical layer transmission that is a sounding reference signal that is generated using a reference signal sequence indicated by the time-varying communication parameter.

Aspect 37: The method of any of aspects 21 through 36, wherein communicating the physical layer transmission comprises: receiving the physical layer transmission that is a physical uplink control channel transmission that is generated using a reference signal sequence indicated by the time-varying communication parameter.

Aspect 38: The method of any of aspects 21 through 37, wherein communicating the physical layer transmission comprises: receiving the physical layer transmission that is a random access channel transmission that is generated using a reference signal sequence indicated by the time-varying communication parameter.

Aspect 39: The method of any of aspects 21 through 38, further comprising: generating a second next output value of the pseudo random sequence generator based at least in part on the key set; determining a second time-varying communication parameter based at least in part on the second next output value of the pseudo random sequence generator; and communicating a second physical layer transmission with the UE based at least in part on the second time-varying communication parameter.

Aspect 40: The method of any of aspects 21 through 39, wherein the pseudo random sequence generator is a stream cipher.

Aspect 41: An apparatus for wireless communications by a UE, comprising a processor; memory coupled with the processor; and instructions stored in the memory and executable by the processor to cause the apparatus to perform a method of any of aspects 1 through 20.

Aspect 42: An apparatus for wireless communications by a UE, comprising at least one means for performing a method of any of aspects 1 through 20.

Aspect 43: A non-transitory computer-readable medium storing code for wireless communications by a UE, the code comprising instructions executable by a processor to perform a method of any of aspects 1 through 20.

Aspect 44: An apparatus for wireless communications by a base station, comprising a processor; memory coupled with the processor; and instructions stored in the memory and executable by the processor to cause the apparatus to perform a method of any of aspects 21 through 40.

Aspect 45: An apparatus for wireless communications by a base station, comprising at least one means for performing a method of any of aspects 21 through 40.

Aspect 46: A non-transitory computer-readable medium storing code for wireless communications by a base station, the code comprising instructions executable by a processor to perform a method of any of aspects 21 through 40.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
   at least one memory; and
   at least one processor coupled to the at least one memory, wherein the UE is configured to:
   generate an output value of a pseudo random sequence generator based at least in part on a key set that is known at least in part by the UE and a serving base station; and
   communicate a physical layer transmission with the serving base station based at least in part on a time-varying communication parameter, wherein the time-varying communication parameter is based at least in part on the output value of the pseudo random sequence generator, and wherein:

(a) to communicate the physical layer transmission, the UE is configured to communicate the physical layer transmission based at least in part on one or more frequency domain tones indicated by the time-varying communication parameter;
(b) to communicate the physical layer transmission, the UE is configured to communicate the physical layer transmission based at least in part on one or more time-domain symbols indicated by the time-varying communication parameter;
(c) to generate the output value, the UE is configured to generate the output value based at least in part on a current state of the pseudo random sequence generator, wherein the current state of the pseudo random sequence generator is known to the UE and the serving base station based at least in part on at least one of a prior communication or a current communication;
(d) to communicate the physical layer transmission, the UE is configured to receive the physical layer transmission that includes a physical cell identifier index in at least one of a primary synchronization signal or a secondary synchronization signal, wherein the physical cell identifier index is indicated by the time-varying communication parameter;
(e) to communicate the physical layer transmission, the UE is configured to receive the physical layer transmission, wherein the physical layer transmission is scrambled according to a scrambling sequence indicated by the time-varying communication parameter;
(f) to communicate the physical layer transmission, the UE is configured to receive, in accordance with a mapping for at least one control channel element to at least one physical resource, the physical layer transmission, wherein the time-varying communication parameter indicates the mapping;
(g) to communicate the physical layer transmission, the UE is configured to receive the physical layer transmission based at least in part on a number of time-domain symbols for the physical layer transmission indicated by the time-varying communication parameter;
(h) the UE is configured to: generate a second output value of the pseudo random sequence generator based at least in part on the key set, and communicate a second physical layer transmission with the serving base station based at least in part on a second time-varying communication parameter, wherein the second time-varying communication parameter is based at least in part on the second output value; or
(i) the time-varying communication parameter indicates a reference signal sequence, and wherein:
(1) to communicate the physical layer transmission, the UE is configured to receive the physical layer transmission, wherein the physical layer transmission is associated with the reference signal sequence indicated by the time-varying communication parameter; or
(2) to communicate the physical layer transmission, the UE is configured to transmit the physical layer transmission using the reference signal sequence.

2. The UE of claim 1, wherein, to communicate the physical layer transmission, the UE is configured to:
communicate the physical layer transmission based at least in part on the one or more frequency domain tones indicated by the time-varying communication parameter.

3. The UE of claim 2, wherein the physical layer transmission is a synchronization signal block, a physical downlink control channel transmission, a physical uplink control channel transmission, a random access channel transmission, a channel state information reference signal, a sounding reference signal, or any combination thereof.

4. The UE of claim 1, wherein, to communicate the physical layer transmission, the UE is configured to:
communicate the physical layer transmission based at least in part on the one or more time-domain symbols indicated by the time-varying communication parameter.

5. The UE of claim 4, wherein the physical layer transmission is a synchronization signal block, a physical downlink control channel transmission, a physical uplink control channel transmission, a random access channel transmission, a channel state information reference signal, a sounding reference signal, or any combination thereof.

6. The UE of claim 1, wherein the key set comprises a symmetric key that is known by the UE and the serving base station.

7. The UE of claim 1, wherein the key set comprises a public key and a private key, wherein the public key is known by the UE and the private key is known by the serving base station, or the private key is known by the UE and the public key is known by the serving base station.

8. The UE of claim 1, wherein, to generate the output value, the UE is configured to:
generate the output value based at least in part on the current state of the pseudo random sequence generator, wherein the current state of the pseudo random sequence generator is known to the UE and the serving base station based at least in part on at least one of the prior communication or the current communication.

9. The UE of claim 1, wherein, to communicate the physical layer transmission, the UE is configured to:
receive the physical layer transmission that includes the physical cell identifier index in at least one of the primary synchronization signal or the secondary synchronization signal, wherein the physical cell identifier index is indicated by the time-varying communication parameter, and wherein the physical layer transmission is a synchronization signal block.

10. The UE of claim 1, wherein, to communicate the physical layer transmission, the UE is configured to:
receive the physical layer transmission, wherein the physical layer transmission is associated with the reference signal sequence indicated by the time-varying communication parameter, and wherein the physical layer transmission is at least a demodulation reference signal modulation symbol.

11. The UE of claim 1, wherein, to communicate the physical layer transmission, the UE is configured to:
receive the physical layer transmission, wherein the physical layer transmission is scrambled according to the scrambling sequence indicated by the time-varying communication parameter, and wherein the physical layer transmission is a physical downlink control channel transmission.

12. The UE of claim 1, wherein, to communicate the physical layer transmission, the UE is configured to:
receive, in accordance with the mapping for the at least one control channel element to the at least one physical resource, the physical layer transmission, wherein the time-varying communication parameter indicates the mapping.

13. The UE of claim 12, wherein the time-varying communication parameter indicates the mapping via at least one of an interleaver size or a resource element group bundle size, wherein the physical layer transmission that is a physical downlink control channel transmission, and wherein the mapping for the at least one control channel element to the at least one physical resource is for the physical downlink control channel transmission.

14. The UE of claim 12, wherein the time-varying communication parameter indicates the mapping via a shift index, wherein the physical layer transmission is a physical downlink control channel transmission, and wherein the mapping for the at least one control channel element to the at least one physical resource is for the physical downlink control channel transmission.

15. The UE of claim 1, wherein, to communicate the physical layer transmission, the UE is configured to:
receive the physical layer transmission based at least in part on the number of time-domain symbols for the physical layer transmission indicated by the time-varying communication parameter.

16. The UE of claim 1, wherein, to communicate the physical layer transmission, the UE is configured to:
receive the physical layer transmission, wherein the physical layer transmission is associated with the reference signal sequence indicated by the time-varying communication parameter, and wherein the physical layer transmission is a channel state information reference signal.

17. The UE of claim 1, wherein, to communicate the physical layer transmission, the UE is configured to:
transmit the physical layer transmission using the reference signal sequence indicated by the time-varying communication parameter, wherein the physical layer transmission is a sounding reference signal.

18. The UE of claim 1, wherein, to communicate the physical layer transmission, the UE is configured to:
transmit the physical layer transmission using the reference signal sequence indicated by the time-varying communication parameter, wherein the physical layer transmission is a physical uplink control channel transmission.

19. The UE of claim 1, wherein, to communicate the physical layer transmission, the UE is configured to:
transmit the physical layer transmission using the reference signal sequence indicated by the time-varying communication parameter, wherein the physical layer transmission is a random access channel transmission.

20. The UE of claim 1, wherein the UE is configured to:
generate the second output value of the pseudo random sequence generator based at least in part on the key set; and
communicate the second physical layer transmission with the serving base station based at least in part on a second time-varying communication parameter, wherein the second time-varying communication parameter is based at least in part on the second output value.

21. The UE of claim 1, wherein the pseudo random sequence generator is a stream cipher.

22. A base station for wireless communication, comprising:
at least one memory; and
at least one processor coupled to the at least one memory, wherein the base station is configured to:
generate an output value of a pseudo random sequence generator based at least in part on a key set that is known at least in part by a user equipment (UE) and the base station; and
communicate a physical layer transmission with the UE based at least in part on a time-varying communication parameter, wherein the time-varying communication parameter is based at least in part on the output value of the pseudo random sequence generator, and wherein:
(a) to communicate the physical layer transmission, the base station is configured to communicate the physical layer transmission based at least in part on one or more frequency domain tones indicated by the time-varying communication parameter;
(b) to communicate the physical layer transmission, the base station is configured to communicate the physical layer transmission based at least in part on one or more time-domain symbols indicated by the time-varying communication parameter; or
(c) to generate the output value, the base station is configured to generate the output value based at least in part on a current state of the pseudo random sequence generator, wherein the current state of the pseudo random sequence generator is known to the UE and the base station based at least in part on at least one of a prior communication or a current communication.

23. The base station of claim 22, wherein, to communicate the physical layer transmission, the base station is configured to:
communicate the physical layer transmission based at least in part on the one or more frequency domain tones indicated by the time-varying communication parameter.

24. The base station of claim 23, wherein the physical layer transmission is a synchronization signal block, a physical downlink control channel transmission, a physical uplink control channel transmission, a random access channel transmission, a channel state information reference signal, a sounding reference signal, or any combination thereof.

25. The base station of claim 22, wherein, to communicate the physical layer transmission, the base station is configured to:
communicate the physical layer transmission based at least in part on the one or more time-domain symbols indicated by the time-varying communication parameter.

26. The base station of claim 25, wherein the physical layer transmission is a synchronization signal block, a physical downlink control channel transmission, a physical uplink control channel transmission, a random access channel transmission, a channel state information reference signal, a sounding reference signal, or any combination thereof.

27. The base station of claim 22, wherein the key set comprises a symmetric key that is known by the UE and the base station.

28. The base station of claim 22, wherein the key set comprises a public key and a private key, wherein the public key is known by the UE and the private key is known by the base station, or the private key is known by the UE and the public key is known by the base station.

29. The base station of claim 22, wherein, to generate the output value, the base station is configured to:
generate the output value based at least in part on the current state of the pseudo random sequence generator, wherein the current state of the pseudo random sequence generator is known to the UE and the base station based at least in part on at least one of the prior communication or the current communication.

30. A method of wireless communication performed by a user equipment (UE), comprising:
generating an output value of a pseudo random sequence generator based at least in part on a key set that is known at least in part by the UE and a serving base station; and
communicating a physical layer transmission with the serving base station based at least in part on a time-varying communication parameter, wherein the time-varying communication parameter is based at least in part on the output value of the pseudo random sequence generator, and wherein:
(a) communicating the physical layer transmission comprises communicating the physical layer transmission based at least in part on one or more frequency domain tones indicated by the time-varying communication parameter;
(b) communicating the physical layer transmission comprises communicating the physical layer transmission based at least in part on one or more time-domain symbols indicated by the time-varying communication parameter;
(c) generating the output value comprises generating the output value based at least in part on a current state of the pseudo random sequence generator, wherein the current state of the pseudo random sequence generator is known to the UE and the serving base station based at least in part on at least one of a prior communication or a current communication;
(d) communicating the physical layer transmission comprises receiving the physical layer transmission that includes a physical cell identifier index in at least one of a primary synchronization signal or a secondary synchronization signal, wherein the physical cell identifier index is indicated by the time-varying communication parameter;
(e) communicating the physical layer transmission comprises receiving the physical layer transmission, wherein the physical layer transmission is scrambled according to a scrambling sequence indicated by the time-varying communication Parameter;
(f) communicating the physical layer transmission comprises receiving, in accordance with a mapping for at least one control channel element to at least one physical resource, the physical layer transmission, wherein the time-varying communication parameter indicates the mapping;
(g) communicating the physical layer transmission comprises receiving the physical layer transmission based at least in part on a number of time-domain symbols for the physical layer transmission indicated by the time-varying communication parameter;
(h) the method further comprises: generating a second output value of the pseudo random sequence generator based at least in part on the key set, and communicating a second physical layer transmission with the serving base station based at least in part on a second time-varying communication parameter, wherein the second time-varying communication parameter is based at least in part on the second output value; or
(i) the time-varying communication parameter indicates a reference signal sequence, and wherein the method further comprises:
(1) communicating the physical layer transmission comprises receiving the physical layer transmission, wherein the physical layer transmission is associated with the reference signal sequence indicated by the time-varying communication parameter; or
(2) communicating the physical layer transmission comprises transmitting the physical layer transmission using the reference signal sequence.

31. The method of claim 30, wherein communicating the physical layer transmission comprises:
communicating the physical layer transmission based at least in part on the one or more frequency domain tones indicated by the time-varying communication parameter.

32. The method of claim 30, wherein communicating the physical layer transmission comprises:
communicating the physical layer transmission based at least in part on the one or more time-domain symbols indicated by the time-varying communication parameter.

33. The method of claim 30, wherein generating the output value comprises:
generating the output value based at least in part on the current state of the pseudo random sequence generator, wherein the current state of the pseudo random sequence generator is known to the UE and the serving base station based at least in part on at least one of the prior communication or the current communication.

34. The method of claim 30, wherein communicating the physical layer transmission comprises:
receiving the physical layer transmission that includes the physical cell identifier index in at least one of the primary synchronization signal or the secondary synchronization signal, wherein the physical cell identifier index is indicated by the time-varying communication parameter, and wherein the physical layer transmission is a synchronization signal block.

35. The method of claim 30, wherein communicating the physical layer transmission comprises:
receiving the physical layer transmission, wherein the physical layer transmission is associated with the reference signal sequence indicated by the time-varying communication parameter, and wherein the physical layer transmission is at least a demodulation reference signal modulation symbol.

36. The method of claim 30, wherein communicating the physical layer transmission comprises:
receiving the physical layer transmission, wherein the physical layer transmission is scrambled according to the scrambling sequence indicated by the time-varying communication parameter, and wherein the physical layer transmission is a physical downlink control channel transmission.

37. The method of claim 30, wherein communicating the physical layer transmission comprises:
receiving, in accordance with the mapping for the at least one control channel element to the at least one physical resource, the physical layer transmission, wherein the time-varying communication parameter indicates the mapping.

38. The method of claim 37, wherein the time-varying communication parameter indicates the mapping via a shift index, wherein the physical layer transmission is a physical downlink control channel transmission, and wherein the mapping for the at least one control channel element to the at least one physical resource is for the physical downlink control channel transmission.

39. The method of claim 37, wherein the time-varying communication parameter indicates the mapping via at least one of an interleaver size or a resource element group bundle size, wherein the physical layer transmission is a physical downlink control channel transmission, and wherein the mapping for the at least one control channel element to the at least one physical resource is for the physical downlink control channel transmission.

40. The method of claim 30, wherein communicating the physical layer transmission comprises:
receiving the physical layer transmission based at least in part on the number of time-domain symbols for the physical layer transmission indicated by the time-varying communication parameter.

41. The method of claim 30, wherein communicating the physical layer transmission comprises:
receiving the physical layer transmission, wherein the physical layer transmission is associated with the reference signal sequence indicated by the time-varying communication parameter, and wherein the physical layer transmission is a channel state information reference signal.

42. The method of claim 30, wherein communicating the physical layer transmission comprises:
transmitting the physical layer transmission using the reference signal sequence indicated by the time-varying communication parameter, wherein the physical layer transmission is a sounding reference signal.

43. The method of claim 30, wherein communicating the physical layer transmission comprises:
transmitting the physical layer transmission using the reference signal sequence indicated by the time-varying communication parameter, wherein the physical layer transmission is a physical uplink control channel transmission.

44. The method of claim 30, wherein communicating the physical layer transmission comprises:
transmitting the physical layer transmission using the reference signal sequence indicated by the time-varying communication parameter, wherein the physical layer transmission is a random access channel transmission.

45. A method of wireless communication performed by a base station, comprising:
generating an output value of a pseudo random sequence generator based at least in part on a key set that is known at least in part by a user equipment (UE) and the base station; and
communicating a physical layer transmission with the UE based at least in part on a time-varying communication parameter, wherein the time-varying communication parameter is based at least in part on the output value of the pseudo random sequence generator, and wherein:
(a) communicating the physical layer transmission comprises communicating the physical layer transmission based at least in part on one or more frequency domain tones indicated by the time-varying communication parameter;
(b) communicating the physical layer transmission comprises communicating the physical layer transmission based at least in part on one or more time-domain symbols indicated by the time-varying communication parameter; or
(c) generating the output value comprises generating the output value based at least in part on a current state of the pseudo random sequence generator, wherein the current state of the pseudo random sequence generator is known to the UE and the base station based at least in part on at least one of a prior communication or a current communication.

46. The method of claim 45, wherein communicating the physical layer transmission comprises:
communicating the physical layer transmission based at least in part on the one or more frequency domain tones indicated by the time-varying communication parameter.

47. The method of claim 45, wherein communicating the physical layer transmission comprises:
communicating the physical layer transmission based at least in part on the one or more time-domain symbols indicated by the time-varying communication parameter.

48. The method of claim 45, wherein generating the output value comprises:
generating the output value based at least in part on the current state of the pseudo random sequence generator, wherein the current state of the pseudo random sequence generator is known to the UE and the base station based at least in part on at least one of the prior communication or the current communication.

* * * * *